(12) United States Patent
Kahn et al.

(10) Patent No.: US 12,732,010 B2
(45) Date of Patent: Sep. 8, 2026

(54) AUGMENTATION NODES AND ASSOCIATED SYSTEMS AND METHODS

(71) Applicant: Element Energy, Inc., Menlo Park, CA (US)

(72) Inventors: Seth Marshall Kahn, Sonoma, CA (US); Corrado Cammi, Mountain View, CA (US)

(73) Assignee: Element Energy, Inc., Menlo Park, CA (US)

( * ) Notice: Subject to any disclaimer, the term of this patent is extended or adjusted under 35 U.S.C. 154(b) by 642 days.

(21) Appl. No.: 18/363,662

(22) Filed: Aug. 1, 2023

(65) Prior Publication Data

US 2025/0047117 A1 Feb. 6, 2025

(51) Int. Cl.
*H02J 7/50* (2026.01)
*H01M 10/42* (2006.01)
(Continued)

(52) U.S. Cl.
CPC ......... *H02J 7/875* (2026.01); *H01M 10/4257* (2013.01); *H01M 10/441* (2013.01);
(Continued)

(58) Field of Classification Search
CPC ...... H02J 7/875; H02J 7/52; H02J 7/82; H02J 7/84; H02J 7/865; H02J 7/50; H02J 3/32;
(Continued)

(56) References Cited

U.S. PATENT DOCUMENTS 6,160,441 A 12/2000 Stratakos et al.
6,262,558 B1 7/2001 Weinberg
(Continued)

FOREIGN PATENT DOCUMENTS

CA 2667825 A1 5/2008
CN 109860740 6/2019
(Continued)

OTHER PUBLICATIONS

Walker, Geoffrey R., et al., "Cascaded DC-DC Converter Connection of Photovoltaic Modules", IEEE Transactions on Power Electronics, vol. 19, No. 4, (Jul. 2004), 1130-1139.
(Continued)

*Primary Examiner* — Jamara A Franklin
(74) *Attorney, Agent, or Firm* — PdZ Patent Law, PLLC

(57) ABSTRACT

A method for augmenting one or more batteries in an energy storage system includes exchanging energy between one or more first batteries of the energy storage system and a source/load via a plurality of battery power buses. Each of the one or more first batteries is electrically coupled to the plurality of battery power buses without use of a power converter electrically coupled between the first battery and the plurality of battery power buses. The method further includes (a) augmenting the one or more first batteries via one or more augmentation batteries of an augmentation node, where the one or more augmentation batteries are electrically coupled to the plurality of battery power buses via at least one augmentation power converter, and (b) controlling operation of the at least one augmentation power converter at least partially based on state of health of the one or more first batteries.

20 Claims, 18 Drawing Sheets

(51) Int. Cl.
*H01M 10/44* (2006.01)
*H02J 7/00* (2006.01)
*H02J 7/52* (2026.01)
*H02J 7/82* (2026.01)
*H02J 7/84* (2026.01)

(52) U.S. Cl.
CPC *H02J 7/52* (2026.01); *H02J 7/82* (2026.01); *H02J 7/84* (2026.01); *H02J 7/865* (2026.01); *H01M 2010/4271* (2013.01)

(58) Field of Classification Search
CPC ........... H01M 10/4257; H01M 10/441; H01M 2010/4271
See application file for complete search history.

(56) References Cited

U.S. PATENT DOCUMENTS 6,445,244 B1 9/2002 Stratakos et al.
6,777,953 B2 8/2004 Blades
6,835,491 B2 12/2004 Gartstein et al.
6,876,203 B2 4/2005 Blades
6,984,970 B2 1/2006 Capel
7,068,017 B2 6/2006 Willner et al.
7,391,218 B2 6/2008 Kojori et al.
8,158,877 B2 4/2012 Klein et al.
8,395,519 B2 3/2013 Cassidy
8,503,137 B2 8/2013 Panetta
8,643,216 B2 2/2014 Lattin
8,686,693 B2 4/2014 Bhowmik et al.
8,697,267 B2 4/2014 Colello et al.
8,810,199 B2 8/2014 Roeper
8,817,431 B2 8/2014 Tomimbang
8,837,097 B2 9/2014 Zuercher et al.
8,879,218 B2 11/2014 Tomimbang
9,132,734 B2 9/2015 Auguet et al.
9,172,120 B2 10/2015 Pariseau et al.
9,257,729 B2 2/2016 Hermann
9,331,497 B2 5/2016 Beaston
9,425,631 B2 8/2016 Furtner
9,515,496 B1 12/2016 Ying
9,564,762 B2 2/2017 Lee et al.
9,705,341 B2 7/2017 Komatsu et al.
9,806,545 B2 10/2017 Fink
9,865,901 B2 1/2018 Hwang
9,893,385 B1 2/2018 Nayar et al.
9,965,007 B2 5/2018 Amelio et al.
10,018,682 B2 7/2018 Kaupp et al.
10,153,651 B2 12/2018 Taylor et al.
10,270,262 B2 4/2019 Kim et al.
10,347,952 B2 7/2019 Choi et al.
10,553,851 B2 2/2020 Kim
10,714,974 B2 7/2020 Clifton et al.
10,777,851 B2 9/2020 Razzell
10,804,690 B2 10/2020 Ronne et al.
10,928,461 B1 2/2021 Stafl
10,992,149 B1 4/2021 Kahn et al.
11,043,821 B2 6/2021 Nishikawa et al.
11,061,076 B1 7/2021 Fasching et al.
11,258,279 B1 2/2022 Kahn et al.
11,664,670 B1 5/2023 Devie et al.
11,699,909 B1 7/2023 Kahn et al.
11,735,934 B2 8/2023 Kahn et al.
2005/0121067 A1 6/2005 Toyomura et al.
2005/0139258 A1 6/2005 Liu et al.
2005/0151513 A1 7/2005 Cook et al.
2007/0223165 A1 9/2007 Itri et al.
2008/0236648 A1 10/2008 Klein et al.
2008/0303503 A1 12/2008 Wolfs
2009/0195217 A1 8/2009 Choi et al.
2009/0284078 A1 11/2009 Zhang et al.
2009/0284232 A1 11/2009 Zhang et al.
2009/0284240 A1 11/2009 Zhang et al.
2009/0284998 A1 11/2009 Zhang et al.
2010/0207455 A1 8/2010 Erickson, Jr. et al.
2010/0213897 A1 8/2010 Tse
2010/0253150 A1 10/2010 Porter et al.
2010/0288327 A1 11/2010 Lisi et al.
2010/0305770 A1 12/2010 Bhowmik et al.
2010/0327659 A1 12/2010 Lisi et al.
2011/0062784 A1 3/2011 Wolfs
2011/0090607 A1 4/2011 Luebke et al.
2011/0141644 A1 6/2011 Hastings et al.
2011/0234173 A1 9/2011 Kao et al.
2011/0301772 A1 12/2011 Zuercher et al.
2012/0013201 A1 1/2012 Pariseau et al.
2012/0043818 A1 2/2012 Stratakos et al.
2012/0043823 A1 2/2012 Stratakos et al.
2012/0043923 A1 2/2012 Ikriannikov et al.
2012/0044014 A1 2/2012 Stratakos et al.
2012/0089266 A1 4/2012 Tomimbang et al.
2012/0112760 A1 5/2012 Yoscovich et al.
2012/0119746 A1 5/2012 Macris
2012/0133521 A1 5/2012 Rothkopf et al.
2012/0313560 A1 12/2012 Hambitzer et al.
2013/0092208 A1 4/2013 Robbins
2013/0106194 A1 5/2013 Jergovic et al.
2013/0170084 A1 7/2013 Strobl et al.
2013/0176401 A1 7/2013 Monari et al.
2013/0234669 A1 9/2013 Huang et al.
2013/0257323 A1 10/2013 Diamond et al.
2014/0253045 A1 9/2014 Poznar
2014/0368205 A1 12/2014 Svensson et al.
2014/0373894 A1 12/2014 Stratakos et al.
2015/0115736 A1 4/2015 Snyder
2015/0171628 A1 6/2015 Ponec et al.
2015/0377976 A1 12/2015 Maluf et al.
2016/0261127 A1 9/2016 Worry et al.
2016/0311328 A1 10/2016 Kim et al.
2016/0372940 A1 12/2016 Canadi
2017/0054134 A1 2/2017 Choi et al.
2017/0123008 A1 5/2017 Frias et al.
2018/0147947 A1 5/2018 Gebhart
2018/0252195 A1 9/2018 Ciaccio et al.
2019/0198938 A1 6/2019 Fujita et al.
2019/0212383 A1 7/2019 Elliott
2019/0361075 A1 11/2019 Lee et al.
2020/0021107 A1 1/2020 Collins et al.
2020/0127489 A1 4/2020 Chen et al.
2020/0161875 A1 5/2020 Nishikawa et al.
2020/0207219 A1 7/2020 Slepchenkov et al.
2020/0212959 A1 7/2020 Eriksen et al.
2020/0254882 A1 8/2020 Kwon
2020/0350779 A1 11/2020 Tikhonski et al.
2021/0044119 A1 2/2021 Poland et al.
2021/0096398 A1 4/2021 Hekmat et al.
2021/0119455 A1 4/2021 Jaipaul et al.
2022/0057350 A1 2/2022 Fasching et al.
2022/0271543 A1 8/2022 Tenorio et al.
2022/0294238 A1 9/2022 Liu et al.
2023/0011716 A1 1/2023 Kahn et al.
2023/0335995 A1* 10/2023 Brooker .................... H02J 3/32
2024/0128766 A1* 4/2024 Kikuchi .................... H02J 7/56

FOREIGN PATENT DOCUMENTS

EP 0762591 A2 3/1997
EP 3550581 A1 10/2019
EP 35999653 A1 1/2020
WO 2013053445 A1 4/2013
WO 2015200366 A1 12/2015

OTHER PUBLICATIONS

Wolfs, Peter, et al., "Distributed Maximum Power Tracking for High Performance Vehicle Solar Arrays", Australian Universities Power Engineering Conference (AUPEC 2004), (Sep. 2004), 6 pgs.
Machine Translation of WO 2013053445, 11 pages.
Machine Translation of CN 109860740, 24 pages.

* cited by examiner

500

| Battery | Original Capacity (MWh) | Present Capacity (MWh) |
|---|---|---|
| 110(1) | 4.0 | 3.4 |
| 110(2) | 4.0 | 3.0 |
| 110(3) | 4.0 | 2.6 |

600

| Battery | Original Capacity (MWh) | Present Capacity (MWh) |
|---|---|---|
| 110(1) | 4.0 | 3.6 |
| 110(2) | 4.0 | 2.8 |
| 110(3) | 4.0 | 3.2 |

800

| Battery | Original Capacity (MWh) | Present Capacity (MWh) |
|---|---|---|
| 110(1) | 3.0 | 2.7 |
| 110(2) | 3.0 | 2.5 |
| 110(3) | 3.0 | 2.9 |

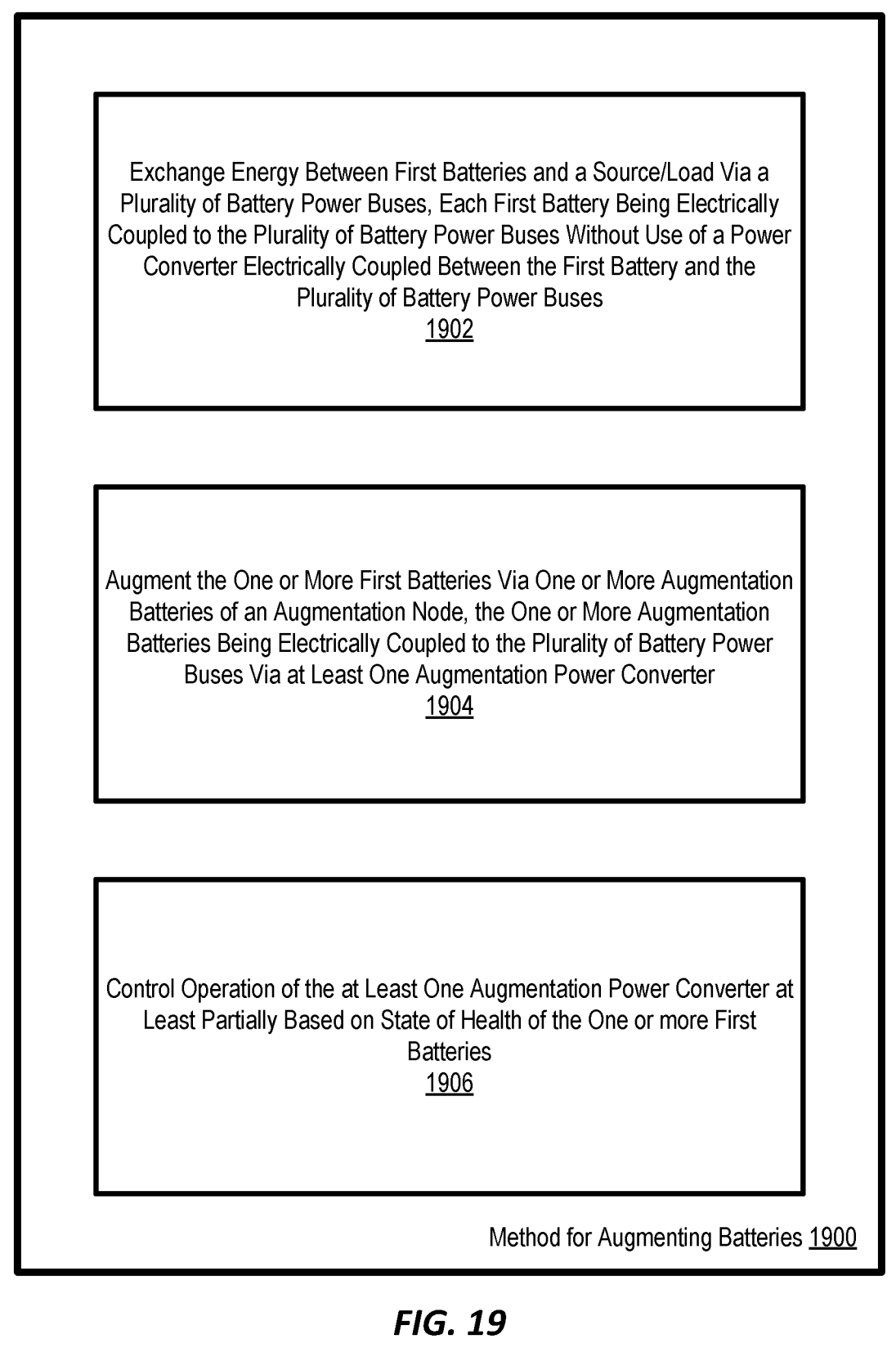

Exchange Energy Between First Batteries and a Source/Load Via a Plurality of Battery Power Buses, Each First Battery Being Electrically Coupled to the Plurality of Battery Power Buses Without Use of a Power Converter Electrically Coupled Between the First Battery and the Plurality of Battery Power Buses
1902

Augment the One or More First Batteries Via One or More Augmentation Batteries of an Augmentation Node, the One or More Augmentation Batteries Being Electrically Coupled to the Plurality of Battery Power Buses Via at Least One Augmentation Power Converter
1904

Control Operation of the at Least One Augmentation Power Converter at Least Partially Based on State of Health of the One or more First Batteries
1906

Method for Augmenting Batteries 1900

*FIG. 19*

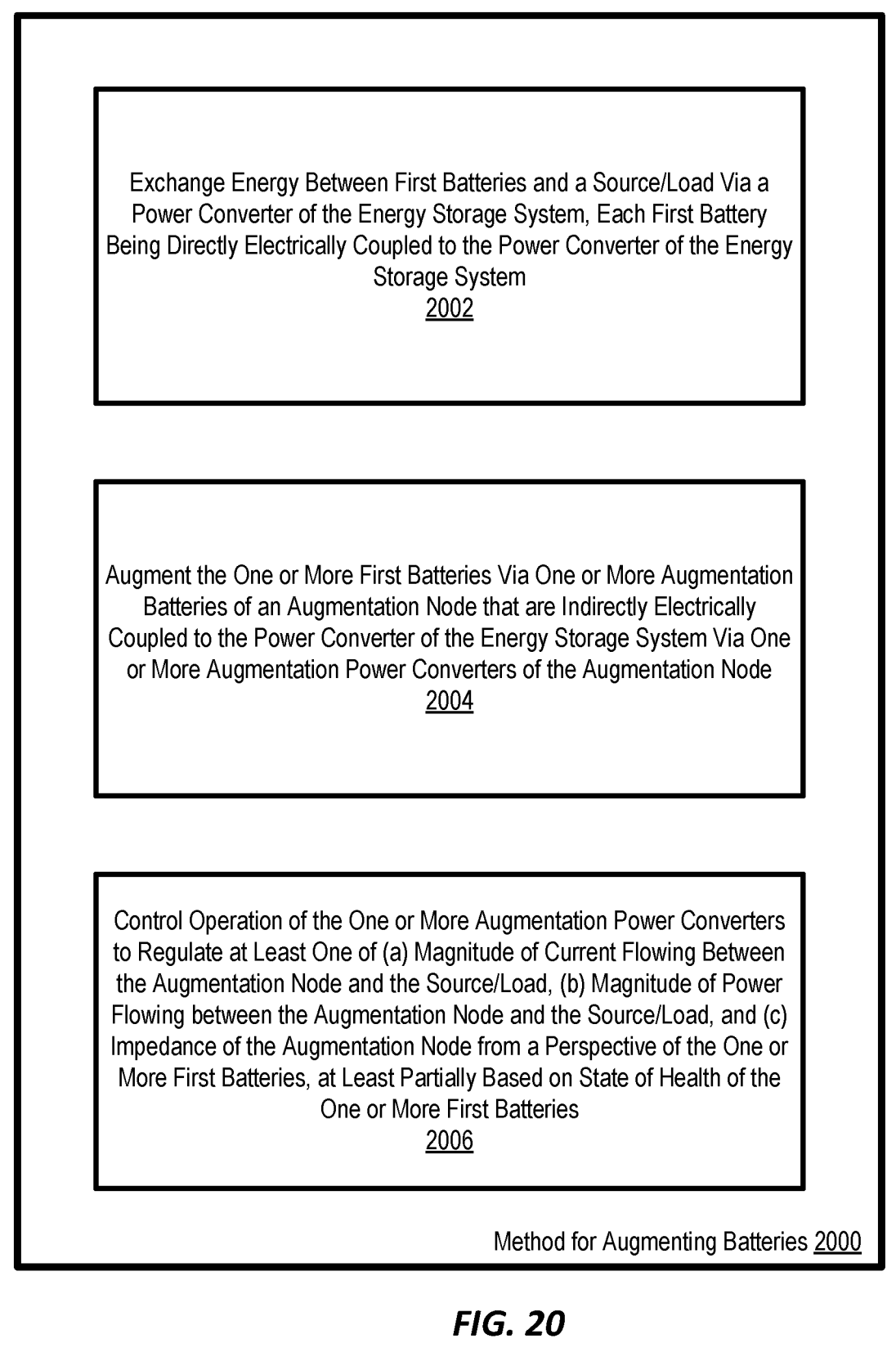

Exchange Energy Between First Batteries and a Source/Load Via a Power Converter of the Energy Storage System, Each First Battery Being Directly Electrically Coupled to the Power Converter of the Energy Storage System
2002

Augment the One or More First Batteries Via One or More Augmentation Batteries of an Augmentation Node that are Indirectly Electrically Coupled to the Power Converter of the Energy Storage System Via One or More Augmentation Power Converters of the Augmentation Node
2004

Control Operation of the One or More Augmentation Power Converters to Regulate at Least One of (a) Magnitude of Current Flowing Between the Augmentation Node and the Source/Load, (b) Magnitude of Power Flowing between the Augmentation Node and the Source/Load, and (c) Impedance of the Augmentation Node from a Perspective of the One or More First Batteries, at Least Partially Based on State of Health of the One or More First Batteries
2006

Method for Augmenting Batteries 2000

*FIG. 20*

Figure 21:
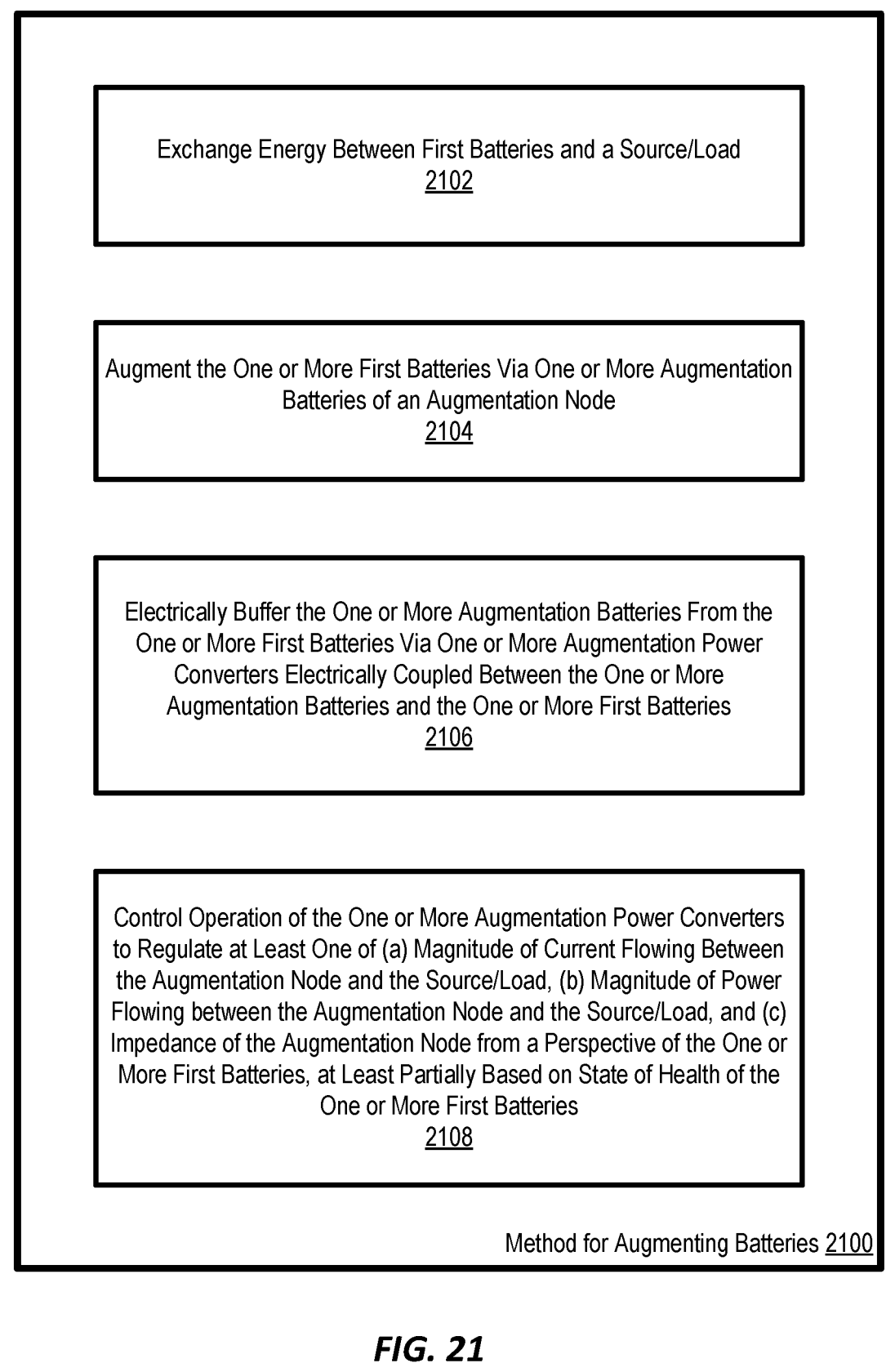

Exchange Energy Between First Batteries and a Source/Load
2102

Augment the One or More First Batteries Via One or More Augmentation Batteries of an Augmentation Node
2104

Electrically Buffer the One or More Augmentation Batteries From the One or More First Batteries Via One or More Augmentation Power Converters Electrically Coupled Between the One or More Augmentation Batteries and the One or More First Batteries
2106

Control Operation of the One or More Augmentation Power Converters to Regulate at Least One of (a) Magnitude of Current Flowing Between the Augmentation Node and the Source/Load, (b) Magnitude of Power Flowing between the Augmentation Node and the Source/Load, and (c) Impedance of the Augmentation Node from a Perspective of the One or More First Batteries, at Least Partially Based on State of Health of the One or More First Batteries
2108

Method for Augmenting Batteries 2100

AUGMENTATION NODES AND ASSOCIATED SYSTEMS AND METHODS

BACKGROUND

A battery is a device including one or more electrochemical cells. While many types of electrochemical cells can be discharged and recharged multiple times, electrochemical cells tend to degrade with use as well as with time. Accordingly, a battery that has been in service for an extended period may have a lower state of health (SOH) than a new battery of like type. State of health of a battery is related to capacity of the battery, i.e., capacity of the battery decreases as state of health of the battery decreases.

Many energy storage systems include batteries for energy storage. An energy storage system may be used, for example, to supplement generation capacity in an electric power grid, to provide backup electric power to a load in case of failure of a primary electric power source, or to store energy from an intermittently available electric power source for use when the intermittently available electric power source is unavailable.

SUMMARY

In a first aspect, a method for augmenting one or more batteries in an energy storage system includes (a) exchanging energy between one or more first batteries of the energy storage system and a source/load via a plurality of battery power buses, each of the one or more first batteries being electrically coupled to the plurality of battery power buses without use of a power converter electrically coupled between the first battery and the plurality of battery power buses, (b) augmenting the one or more first batteries via one or more augmentation batteries of an augmentation node, the one or more augmentation batteries being electrically coupled to the plurality of battery power buses via at least one augmentation power converter, and (c) controlling operation of the at least one augmentation power converter at least partially based on state of health of the one or more first batteries.

In an embodiment of the first aspect, the source/load is capable of both providing electric power to the energy storage system and receiving electric power from the energy storage system.

In another embodiment of the first aspect, the method further includes electrically interfacing the one or more first batteries with the source/load via a power converter electrically coupled between the plurality of battery power buses and the source/load.

In another embodiment of the first aspect, controlling operation of the at least one augmentation power converter at least partially based on the state of health of the one or more first batteries includes controlling the at least one augmentation power converter to regulate magnitude of current flowing between the at least one augmentation power converter and the plurality of battery power buses, at least partially based on the state of health of the one or more first batteries.

In another embodiment of the first aspect, the state of health of the one or more first batteries includes a relationship between present capacity of the one or more first batteries and original capacity of the one or more first batteries.

In another embodiment of the first aspect, controlling operation of the at least one augmentation power converter at least partially based on the state of health of the one or more first batteries includes controlling the at least one augmentation power converter to regulate magnitude of power flowing between the at least one augmentation power converter and the plurality of battery power buses, at least partially based on the state of health of the one or more first batteries.

In another embodiment of the first aspect, controlling operation of the at least one augmentation power converter at least partially based on the state of health of the one or more first batteries includes controlling the at least one augmentation power converter to regulate impedance of the augmentation node, as seen from a perspective of the one or more first batteries, at least partially based on the state of health of the one or more first batteries.

In another embodiment of the first aspect, the method further includes controlling the at least one augmentation power converter based at least partially on state of charge of the one or more first batteries.

In another embodiment of the first aspect, the method further includes controlling the at least one augmentation power converter to decrease a difference between (a) state of charge of the one or more first batteries and (b) state of charge of the one or more augmentation batteries.

In another embodiment of the first aspect, the state of charge of the one or more first batteries includes one of an average state of charge of the one or more first batteries and a median state of charge of the one or more first batteries.

In another embodiment of the first aspect, the state of charge of the one or more augmentation batteries comprises one of an average state of charge of the one or more augmentation batteries and a median state of charge of the one or more augmentation batteries.

In another embodiment of the first aspect, the method further includes iteratively controlling the at least one augmentation power converter to decrease a difference between (a) state of charge of the one or more first batteries and (b) state of charge of the one or more augmentation batteries.

In another embodiment of the first aspect, the method further includes controlling the at least one augmentation power converter to regulate magnitude of current flowing between the at least one augmentation power converter and the plurality of battery power buses, at least partially based on state of charge of the one or more first batteries.

In another embodiment of the first aspect, the method further includes controlling the at least one augmentation power converter to regulate magnitude of power flowing between the at least one augmentation power converter and the plurality of battery power buses, at least partially based on state of charge of the one or more first batteries.

In another embodiment of the first aspect, the method further includes controlling the at least one augmentation power converter to regulate magnitude of impedance of the augmentation node, as seen from a perspective of the one or more first batteries, at least partially based on state of charge of the one or more first batteries.

In a second aspect, an augmented energy storage system includes (a) a first battery power bus, (b) a second battery power bus, (c) one or more first batteries, each first battery being electrically coupled between the first battery power bus and the second battery power bus without use of a power converter, (d) a plurality of augmentation nodes electrically coupled between the first battery power bus and the second battery power bus, each augmentation node including a respective augmentation battery and respective augmentation power converter, and (e) a controller configured to control operation of the respective augmentation power converter of each augmentation node at least partially based on state of health of the one or more first batteries.

In an embodiment of the second aspect, the plurality of augmentation nodes are electrically coupled in series between the first battery power bus and the second battery power bus.

In another embodiment of the second aspect, the plurality of augmentation nodes are electrically coupled in parallel between the first battery power bus and the second battery power bus.

In another embodiment of the second aspect, in each augmentation node, the augmentation power converter of the augmentation node is configured to buffer the augmentation battery of the augmentation node from the respective augmentation battery of each other augmentation node.

In another embodiment of the second aspect, the controller is further configured to control the respective augmentation power converter of each augmentation node at least partially based on the state of health of the one or more first batteries to regulate magnitude of current flowing through the plurality of augmentation nodes.

In another embodiment of the second aspect, the controller is further configured to control the respective augmentation power converter of each augmentation node at least partially based on the state of health of the one or more first batteries to regulate magnitude of power flowing between the plurality of augmentation nodes and the first and second battery power buses.

In another embodiment of the second aspect, the controller is further configured to control the respective augmentation power converter of each augmentation node at least partially based on the state of health of the one or more first batteries to regulate collective impedance of the plurality of augmentation nodes, as seen from a perspective of the one or more first batteries.

In another embodiment of the second aspect, the controller is further configured to control the respective augmentation power converter of each augmentation node at least partially based on the state of charge of the one or more first batteries to regulate magnitude of current flowing through the plurality of augmentation nodes.

In another embodiment of the second aspect, the controller is further configured to control the respective augmentation power converter of each augmentation node at least partially based on state of charge of the one or more first batteries, to regulate magnitude of power flowing between the plurality of augmentation nodes and the first and second battery power buses.

In another embodiment of the second aspect, the controller is further configured to control the respective augmentation power converter of each augmentation node at least partially based on state of charge of the one or more first batteries, to regulate collective impedance of the plurality of augmentation nodes, as seen from a perspective of the one or more first batteries.

In a third aspect, a method for augmenting one or more batteries in an energy storage system includes (a) exchanging energy between one or more first batteries of the energy storage system and source/load via a power converter of the energy storage system, the one or more first batteries being directly electrically coupled to the power converter of the energy storage system, (b) augmenting the one or more first batteries via one or more augmentation batteries of an augmentation node that are indirectly electrically coupled to the power converter of the energy storage system via one or more augmentation power converters of the augmentation node, and (c) controlling operation of the one or more augmentation power converters to regulate at least one of (1) magnitude of current flowing between the augmentation node and the source/load, (2) magnitude of power flowing between the augmentation node and the source/load, and (3) impedance of the augmentation node from a perspective of the one or more first batteries, at least partially based on state of health of the one or more first batteries.

In a fourth aspect, a method for augmenting one or more batteries in an energy storage system includes (a) exchanging energy between one or more first batteries of the energy storage system and a source/load, (b) augmenting the one or more first batteries of the energy storage system via one or more augmentation batteries of an augmentation node, (c) electrically buffering the one or more augmentation batteries from the one or more first batteries via one or more augmentation power converters electrically coupled between the one or more augmentation batteries and the one or more first batteries, (d) controlling operation of the one or more augmentation power converters to regulate at least one of (1) magnitude of current flowing between the augmentation node and the source/load, (2) magnitude of power flowing between the augmentation node and the source/load, and (3) impedance of the augmentation node from a perspective of the one or more first batteries, at least partially based on state of health of the one or more first batteries.

In a fifth aspect, a method for augmenting one or more batteries in an energy storage system includes (a) exchanging energy between one or more first batteries of the energy storage system and a source/load via a plurality of battery power buses, each of the one or more first batteries being electrically coupled to the plurality of battery power buses without use of a power converter electrically coupled between the first battery and the plurality of battery power buses, and (b) augmenting the one or more first batteries via a string of a plurality of augmentation nodes electrically coupled to the plurality of battery power buses, the plurality of augmentation nodes being electrically coupled in series in the string, and each augmentation node including one or more augmentation batteries and an augmentation power converter electrically buffering the one or more augmentation batteries of the augmentation node from the one or more first batteries.

In an embodiment of the fifth aspect, the method further includes controlling the augmentation power converter of each augmentation node to regulate magnitude of current flowing between the string of the plurality of augmentation nodes and the plurality of battery power buses, at least partially based on state of health of the one or more first batteries.

In another embodiment of the fifth aspect, the method further includes controlling the augmentation power converter of each augmentation node to regulate magnitude of power flowing between the string of the plurality of augmentation nodes and the plurality of battery power buses, at least partially based on state of health of the one or more first batteries.

In another embodiment of the fifth aspect, the method further includes controlling the augmentation power converter of each augmentation node to regulate impedance of the string of the plurality of augmentation nodes, as seen from a perspective of the one or more first batteries, at least partially based on state of health of the one or more first batteries.

In another embodiment of the fifth aspect, the method further includes controlling the augmentation power converter of each augmentation node to decrease a difference between (a) state of charge of the one or more first batteries and (b) state of charge of the one or more augmentation batteries of each augmentation node.

In a sixth aspect, an augmented energy storage system includes (a) a first battery power bus, (b) a second battery power bus, (c) one or more first batteries, each first battery being electrically coupled between the first battery power bus and the second battery power bus without use of a power converter, and (d) a string of a plurality of augmentation nodes electrically coupled in series between the first battery power bus and the second battery power bus, each augmentation node including an augmentation battery and an augmentation power converter.

In an embodiment of the sixth aspect, the augmented energy storage system further includes a controller configured to control the augmentation power converter of each augmentation node at least partially based on state of health of the one or more first batteries, to regulate magnitude of current flowing through the plurality of augmentation nodes.

In another embodiment of the sixth aspect, the augmented energy storage system further includes a controller configured to control the augmentation power converter of each augmentation node at least partially based on state of health of the one or more first batteries, to regulate magnitude of power flowing between the plurality of augmentation nodes and the first and second battery power buses.

In another embodiment of the sixth aspect, the augmented energy storage system further includes a controller configured to control the augmentation power converter of each augmentation node at least partially based on state of health of the one or more first batteries, to regulate impedance of the string of the plurality of augmentation nodes, as seen from a perspective of the one or more first batteries.

BRIEF DESCRIPTION OF THE DRAWINGS

FIG. 19 is a block diagram of a method for augmenting one or more batteries in an energy storage system, according to an embodiment.

FIG. 20 is a block diagram of another method for augmenting one or more batteries in an energy storage system, according to an embodiment.

FIG. 21 is a block diagram of an additional method for augmenting one or more batteries in an energy storage system, according to an embodiment.

FIG. 22 is a block diagram of a further method for augmenting one or more batteries in an energy storage system, according to an embodiment.

DETAILED DESCRIPTION OF THE EMBODIMENTS

Figure 1:
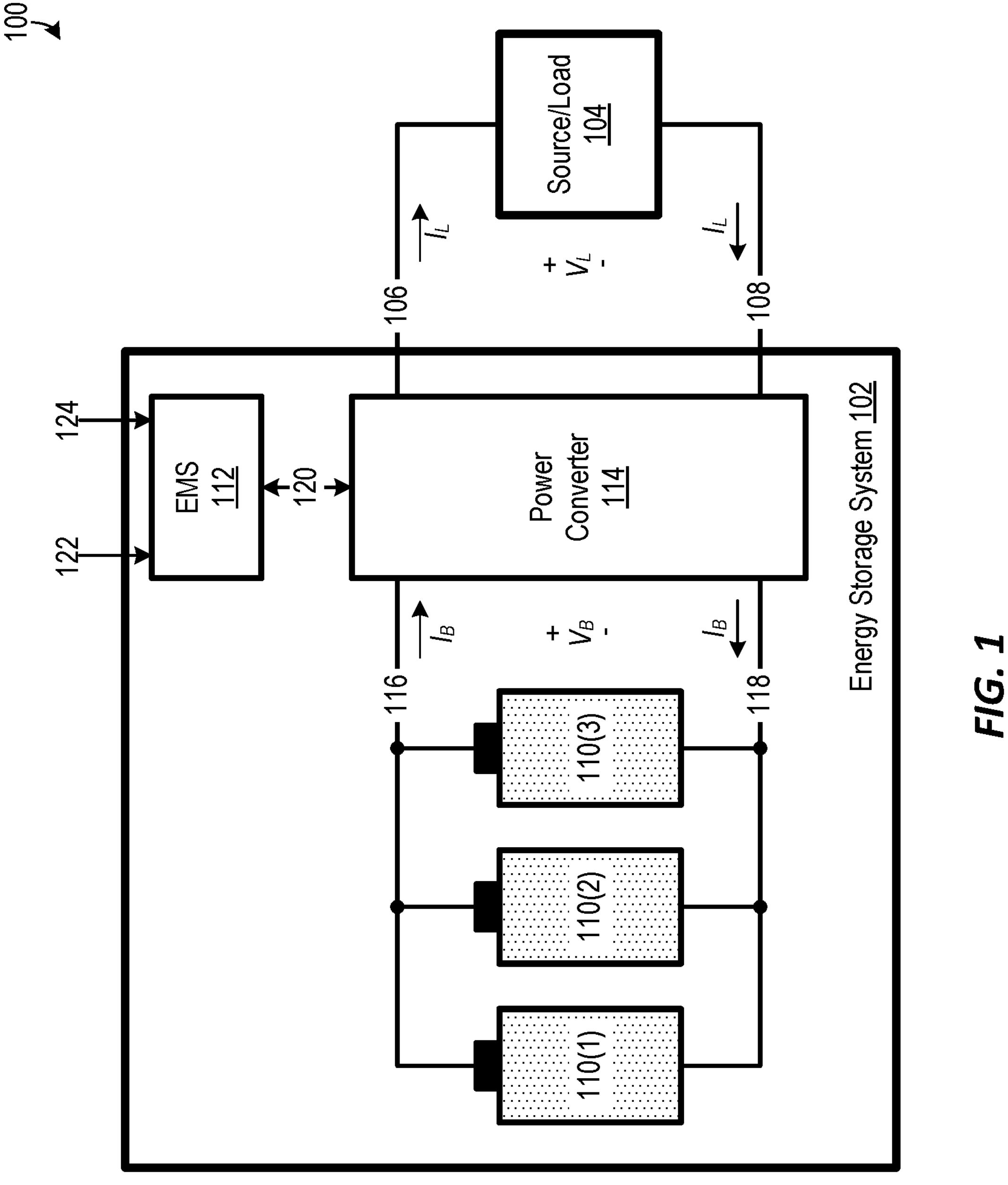
FIG. 1 is a block diagram of an electrical environment including an energy storage system electrically coupled to a source/load.

Degradation of batteries in an energy storage system may reduce capacity of the energy storage system. For example, FIG. 1 is a block diagram of an electrical environment 100 including an energy storage system 102 electrically coupled to a source/load 104 via a first load power bus 106 and a second load power bus 108. Source/load 104 may operate as either an electric power source or an electric load. Source/load 104 provides electric power to energy storage system 102 when source/load 104 operates as an electric power source, and source/load 104 consumes electric power from energy storage system 102 when source/load 104 operates as an electric load. Although source/load 104 is symbolically shown as a single element, source/load 104 could include a plurality of elements, such as a source and a load, a plurality of sources, and/or a plurality of loads. Additionally, source/load 104 may include interface devices, such as DC-to-AC converters, DC-to-DC converters, and/or transformers, configured to electrically couple energy storage system 102 with an energy source and/or an energy sink. In some embodiments, source/load 104 includes one or more of an alternating current (AC) electric power system (e.g., an AC electric power grid), a direct current (DC) electric power system, an electromechanical device, and a photovoltaic device, which are optionally electrically coupled to energy storage system 102 via a DC-to-AC converter of source/load 104, a DC-to-DC converter of source/load 104, and/or a transformer of source/load 104. However, source/load 104 can take other forms without departing from the scope hereof.

Energy storage system 102 includes one or more batteries 110, an energy management system (EMS) 112, a power converter 114, a first battery power bus 116, and a second battery power bus 118. In this document, specific instances of an item may be referred to by use of a numeral in parentheses (e.g. battery 110(1)) while numerals without parentheses refer to any such item (e.g. batteries 110). While energy storage system 102 is depicted as including three batteries 110, the number of batteries 110 in energy storage system 102 may vary as a design choice. Each battery 110 includes one or more electrochemical cells (not shown) electrically coupled in series and/or in parallel within the battery 110. In some embodiments, each battery 110 includes a large number of electrochemical cells, such as tens, hundreds, thousands, or even more, electrochemical cells electrically coupled in series and/or in parallel within the battery 110. For example, in some embodiments, each battery 110 includes an array of electrochemical cells housed in one or more containers. In certain embodiments, the electrochemical cells of batteries 110 are Lithium-ion (Li-ion) electrochemical cells, lead acid electrochemical cells, or Nickel-based electrochemical cells.

Batteries 110 are electrically coupled together via first battery power bus 116 and second battery power bus 118. While FIG. 1 depicts batteries 110 as being electrically coupled in parallel via first battery power bus 116 and second battery power bus 118, batteries 110 could alternately be electrically coupled in series, or in a parallel-series combination. First battery power bus 116 and second battery power bus 118 also electrically couple batteries 110 to power converter 114.

Power converter 114 is electrically coupled between (a) first battery power bus 116 and second battery power bus 118 and (b) and first load power bus 106 and second load power bus 108. Accordingly, power converter 114 electrically interfaces batteries 110 with source/load 104. In embodiments where a voltage $V_L$ across source/load 104 is an AC voltage, power converter 114 is an inverter. On the other hand, in embodiments where voltage $V_L$ across source/load 104 is a DC voltage, power converter 114 is a DC-to-DC converter. Power converter 114 is configured to convert a voltage $V_B$ between first battery power bus 116 and second battery power bus 118 to voltage $V_L$ across source/load 104 (or vice versa). Additionally, power converter 114 is configured to convert a current $I_B$ flowing between batteries 110 and power converter 114 to a current $I_L$ flowing between power converter 114 and source/load 104 (or vice versa). Voltage $V_B$ is a DC voltage, and current $I_B$ is a DC current. As discussed above, voltage $V_L$ could be either an AC voltage or a DC voltage, depending on the configuration of power converter 114 and source/load 104. Similarly, current $I_L$ could be either an AC current or a DC current, depending on the configuration of power converter 114 and source/load 104.

EMS 112 is communicatively coupled 120 to power converter 114, and EMS 112 is configured to at least partially control operation of power converter 114. For example, EMS 112 may control operation of power converter 114 to provide energy stored in batteries 110 to source/load 104 in response to a signal, such as in response to a signal 122 requesting delivery of electric power to source/load 104. Signal 122 is asserted, for example, in response to source/load 104 having insufficient generation capacity to meet electric power demand, failure of a primary electric power source of source/load 104, price paid for electric power supplied to source/load 104 rising above a threshold value, an intermittent electric power source of source/load 104 becoming unavailable, etc. As another example, EMS 112 may control operation of power converter 114 to store energy received from source/load 104 in batteries 110 in response to a signal, such as in response to a signal 124 requesting that energy storage system 102 store energy received from source/load 104. Signal 124 is asserted, for example, in response to state of charge of batteries 110 dropping below a threshold value, a cost of energy provided by source/load 104 dropping below a threshold value, an intermittent electric power source of source/load 104 becoming available, etc. EMS 112 is optionally communicatively coupled to batteries 110, such as to enable EMS 112 to monitor one or more characteristics of batteries 110 (e.g., battery voltage magnitude, battery current magnitude, and/or battery temperature) and/or to enable EMS 112 to control optional disconnect switches (not shown) within batteries 110 or electrically coupled to batteries 110. Optional connections between EMS 112 and batteries 110 are not shown in FIG. 1.

Assume that each battery 110 has a capacity of 4 Megawatt hours (MWh) when the battery is new. In this scenario, energy storage system 102 has a capacity of 12 MWh, and energy storage system 102 is therefore capable of providing 12 MWh to source/load 104. Now assume that batteries 110 have degraded such that each battery 110 has lost 25 percent of its capacity, i.e., each battery now has a capacity of only 3 MWh. Under this scenario, energy storage system 102 has a capacity of 9 MWh, and energy storage system 102 is therefore capable of providing only 9 MWh to source/load 104. Such loss of capacity of energy storage system 102 may be problematic. For example, an operator of energy storage system 102 may be unable to meet contractual requirements to supply energy to source/load 104. As another example, energy storage system 102 may be unable to provide backup power for a sufficient amount of time in case of failure or unavailability of a primary electric power source of source/load 104. While degraded batteries 110 can be replaced with new batteries 110 to restore capacity of energy storage system 102, it is typically desirable to operate batteries 110 until they have experienced a substantial loss in capacity, such as 40 percent loss in capacity or more, because batteries 110 are generally expensive. Additionally, replacement batteries 110 may not be readily available.

Disclosed herein are augmentation nodes and associated systems and methods which at least partially overcome the aforementioned problems associated with battery degradation in an energy storage system. In certain embodiments, one or more augmentation nodes are electrically coupled to degraded batteries in an energy storage system, where each augmentation node includes one more augmentation batteries configured to at least partially compensate for degradation of the degraded batteries by providing additional energy storage capacity for the energy storage system. In some embodiments, an augmentation controller is configured to control an augmentation power converter of an augmentation node to (a) cause the augmentation node to provide a constant current based on state of health (SOH) (or present capacity) of the degraded batteries, (b) cause the augmentation node to provide a constant power based on state of health (or present capacity) of the degraded batteries, or (c) cause the augmentation node to exhibit an impedance that is a function of impedance and state of health (or present capacity) of the degraded batteries. Additionally, in some embodiments, an augmentation controller is configured to control one or more augmentation batteries of an augmentation node to track state of charge (SOC) of degraded batteries of an energy storage system, e.g., so that the augmentation batteries become fully discharged, or become fully charged, at the same time as the degraded batteries.

Accordingly, the new augmentation nodes and associated systems and methods may advantageously enable an energy storage system with degraded batteries to operate at least substantially at its rated capacity without requiring replacement of the degraded batteries. As such, the new augmentation nodes and associated systems and methods promote economy and resource conservation by extending useful life of degraded batteries in an energy storage system. Additionally, particular embodiments of the new augmentation nodes may be used to increase capacity of an energy storage system including batteries that are not significantly degraded.

Figure 2:
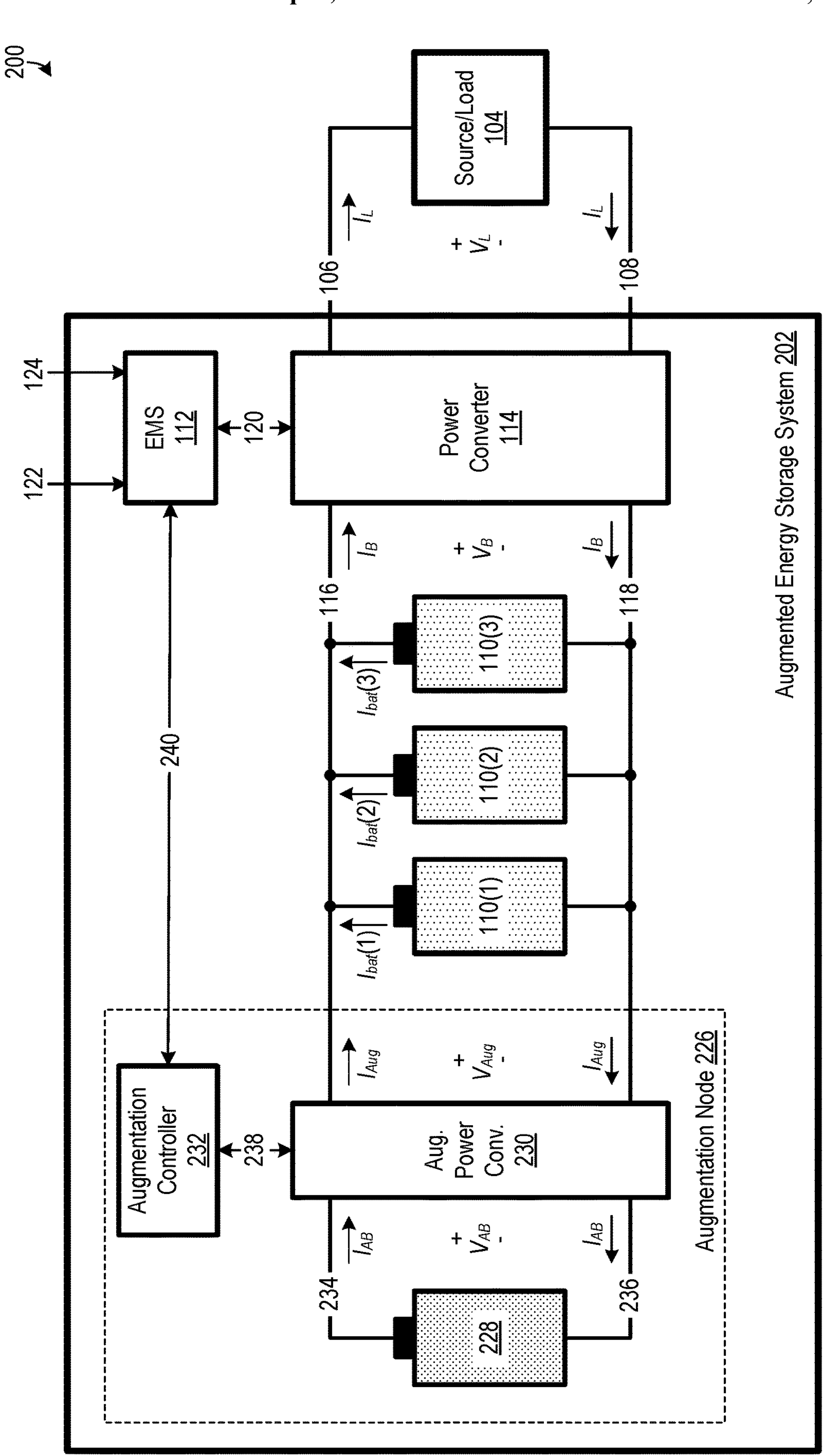
FIG. 2 is a block diagram of an electrical environment including an augmented energy storage system electrically coupled to a source/load, according to an embodiment.

FIG. 2 is a block diagram of an electrical environment 200 including an augmented energy storage system 202 electrically coupled to source/load 104 via first load power bus 106 and second load power bus 108. Augmented energy storage system 202 differs from energy storage system 102 (FIG. 1) in that augmented energy storage system 202 further includes an augmentation node 226. Source/load 104, first load power bus 106, second load power bus 108, batteries 110, EMS 112, power converter 114, first battery power bus 116, and second battery power bus 118 operate in electrical environment 200 in the same manner as discussed above with respect to electrical environment 100 (FIG. 1).

Augmentation node 226 includes an augmentation battery 228, an augmentation power converter 230, and an augmentation controller 232. Augmentation battery 228 includes one or more electrochemical cells (not shown) electrically coupled in series and/or in parallel within augmentation battery 228. In some embodiments, augmentation battery 228 includes a large quantity of electrochemical cells, such as tens, hundreds, thousands, or even more, electrochemical cells electrically coupled in series and/or in parallel within augmentation battery 228, where the electrochemical cells need not be commonly packaged. For example, in some embodiments, augmentation battery 228 includes one or more arrays of electrochemical cells housed in one or more containers. As another example, in some other embodiments, augmentation battery 228 includes a plurality of modules of electrochemical cells electrically coupled in series and/or in parallel. However, it is understood that augmentation battery 228 could include as few as one electrochemical cell without departing from the scope hereof.

In certain embodiments, the electrochemical cells of augmentation battery 228 are Li-ion electrochemical cells. The electrochemical cells of augmentation battery 228 need not be the same type of electrochemical cells as the electrochemical cells of batteries 110, which promotes compatibility of augmentation node 226 with a wide variety of battery 110 types. In some embodiments, augmentation node 226 is configured as an "universal" augmentation node in that it is compatible with a wide variety of energy storage systems. For example, in certain embodiments, augmentation node 226 is compatible with energy storage systems including varying battery 110 types and/or with energy storage systems including varying quantities of batteries 110. Additionally, in some embodiments, all elements of augmentation node 226 are commonly packaged, such as in a common module, a common container, etc., to facilitate ease of deployment of augmentation node 226 in an energy storage system. Augmentation node 226 could be modified to include one or more additional augmentation batteries 228, where the augmentation batteries are electrically coupled in parallel, in series, or in a parallel-series combination, such as discussed below with respect to FIGS. 15 and 16.

Augmentation battery 228 is electrically coupled between a first augmentation power bus 234 and a second augmentation power bus 236. Augmentation power converter 230 is electrically coupled between (a) first augmentation power bus 234 and second augmentation power bus 236 and (b) and first battery power bus 116 and second battery power bus 118. Accordingly, augmentation power converter 230 electrically interfaces augmentation battery 228 with batteries 110, and augmentation power converter 230 also electrically interfaces augmentation battery 228 with power converter 114. Augmentation power converter 230 is configured to convert a voltage $V_{AB}$ between first augmentation power bus 234 and second augmentation power bus 236 to a voltage $V_{Aug}$ at augmentation power converter 230 between first battery power bus 116 and second battery power bus 118 (or vice versa). Voltage $V_{Aug}$ is the same as voltage $V_B$ in augmented energy storage system 202 because augmentation node 226 is electrically coupled between first battery power bus 116 and second battery power bus 118. Augmentation power converter 230 is additionally configured to convert a current $I_{AB}$ flowing between augmentation battery 228 and augmentation power converter 230 to current $I_{Aug}$ flowing between (a) augmentation power converter 230 and (b) first battery power bus 116 and second battery power bus 118 (or vice versa). Voltage $V_{AB}$ is a DC voltage, and current $I_{AB}$ is a DC current. Current $I_B$ is the sum of current $I_{Aug}$ and respective currents $I_{bat}$ flowing through each battery 110, in augmented energy storage system 202.

It should be noted that while batteries 110 are electrically coupled to first battery power bus 116 and second battery power bus 118 without any intervening power converters, augmentation battery 228 is electrically coupled to first battery power bus 116 and second battery power bus 118 via augmentation power converter 230. As such, batteries 110 are directly electrically coupled to power converter 114 while augmentation battery 228 is indirectly electrically coupled to power converter 114 via augmentation power converter 230. Additionally, augmentation power converter 230 electrically buffers augmentation battery 228 from batteries 110.

Augmentation power converter 230 is, for example, a DC-to-DC converter, such as a boost converter, a buck converter, a buck-boost converter, a buck and boost converter, or an isolated switching power converter. Augmentation power converter 230 could include a plurality of power converters (not shown), such as a first power converter configured to transfer power from augmentation battery 228 to power converter 114 and a second power converter configured to transfer power from power converter 114 to augmentation battery 228. In some embodiments where augmentation power converter 230 has a non-isolated topology, first augmentation power bus 234 and first battery power bus 116 are part of a common electrical node. In some other embodiments where augmentation power converter 230 has a non-isolated topology, second augmentation power bus 236 and second battery power bus 118 are part of a common electrical node.

Augmentation controller 232 is communicatively coupled 238 to augmentation power converter 230, and augmentation controller 232 is configured to at least partially control operation of augmentation power converter 230. Augmentation controller 232 is optionally also communicatively coupled 240 to EMS 112, such as to enable augmentation controller 232 to receive from EMS 112 information related to batteries 110 and/or source/load 104, such as one or more of state of health of batteries 110, present capacity of batteries 110, original capacity of batteries 110, state of charge of batteries 110, magnitude of respective current $I_{bat}$ flowing through each battery 110, magnitude of voltage $V_B$, respective impedance of each battery 110, magnitude of power collectively provided by batteries 110 to source/load 104, magnitude of load presented to augmented energy storage system 202 by source/load 104, magnitude of power provided to augmented energy storage system 202 by source/load 104, etc.

Figure 3:
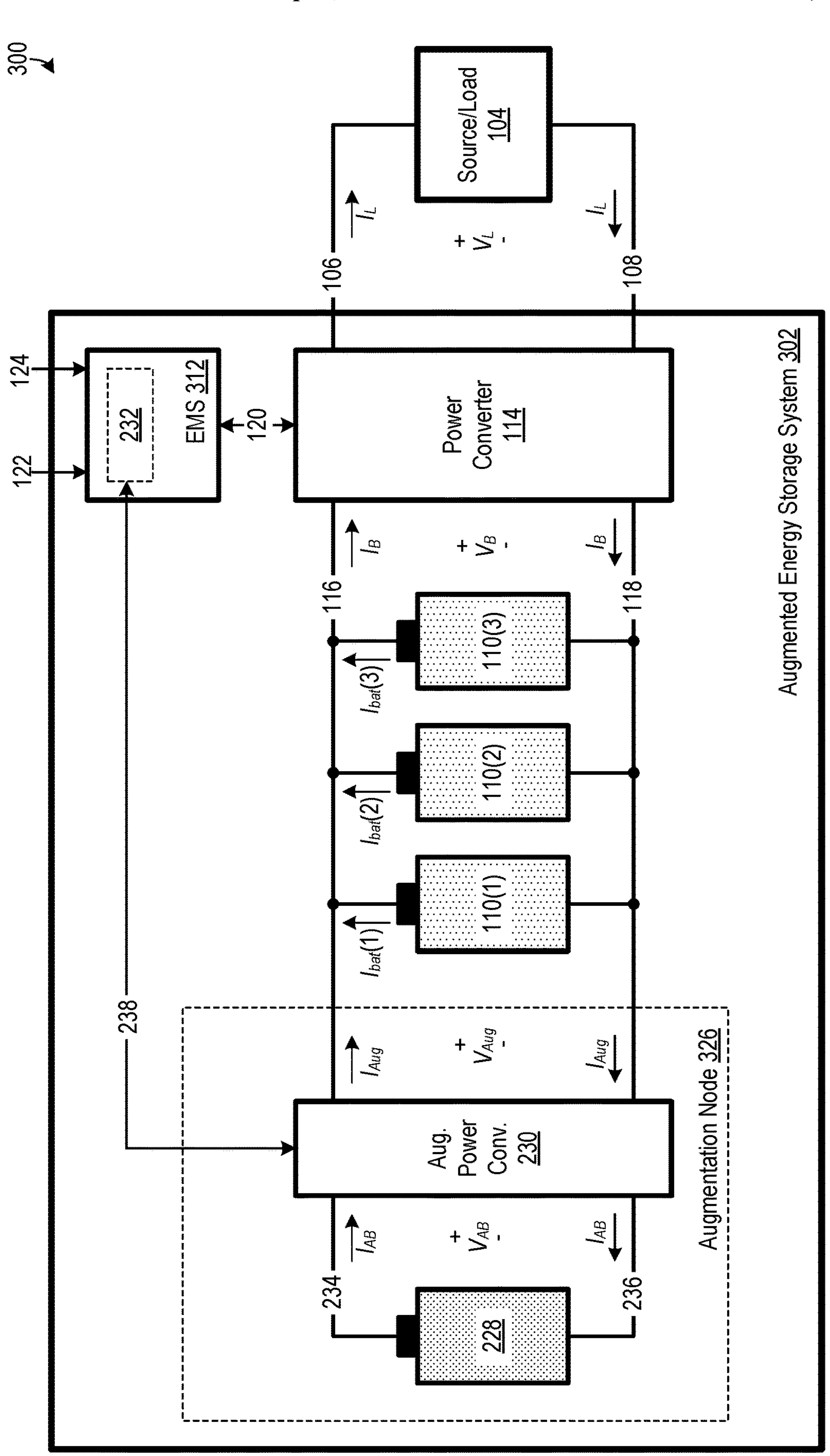
FIG. 3 is a block diagram of an alternate embodiment of the FIG. 2 electrical environment where an augmentation controller is implemented in an energy management system (EMS).

In some alternate embodiments of augmented energy storage system 202, augmentation controller 232 is part of EMS 112, instead of being an element of augmentation node 226. For example, FIG. 3 is a block diagram of an electrical environment 300, which is an alternate embodiment of electrical environment 200 (FIG. 2) with augmented energy storage system 202 replaced with an augmented energy storage system 302. Augmented energy storage system 302 differs from augmented energy storage system 202 in that (a) augmentation node 226 is replaced with an augmentation node 326 and (b) EMS 112 is replaced with an EMS 312. Augmentation node 326 differs from augmentation node 226 in that augmentation controller 232 is omitted from augmentation node 326, and EMS 312 differs from EMS 112 in that EMS 312 further includes augmentation controller 232. Augmentation controller 232 is implemented, for example, by software, firmware, and/or hardware, in EMS 312.

Figure 4:
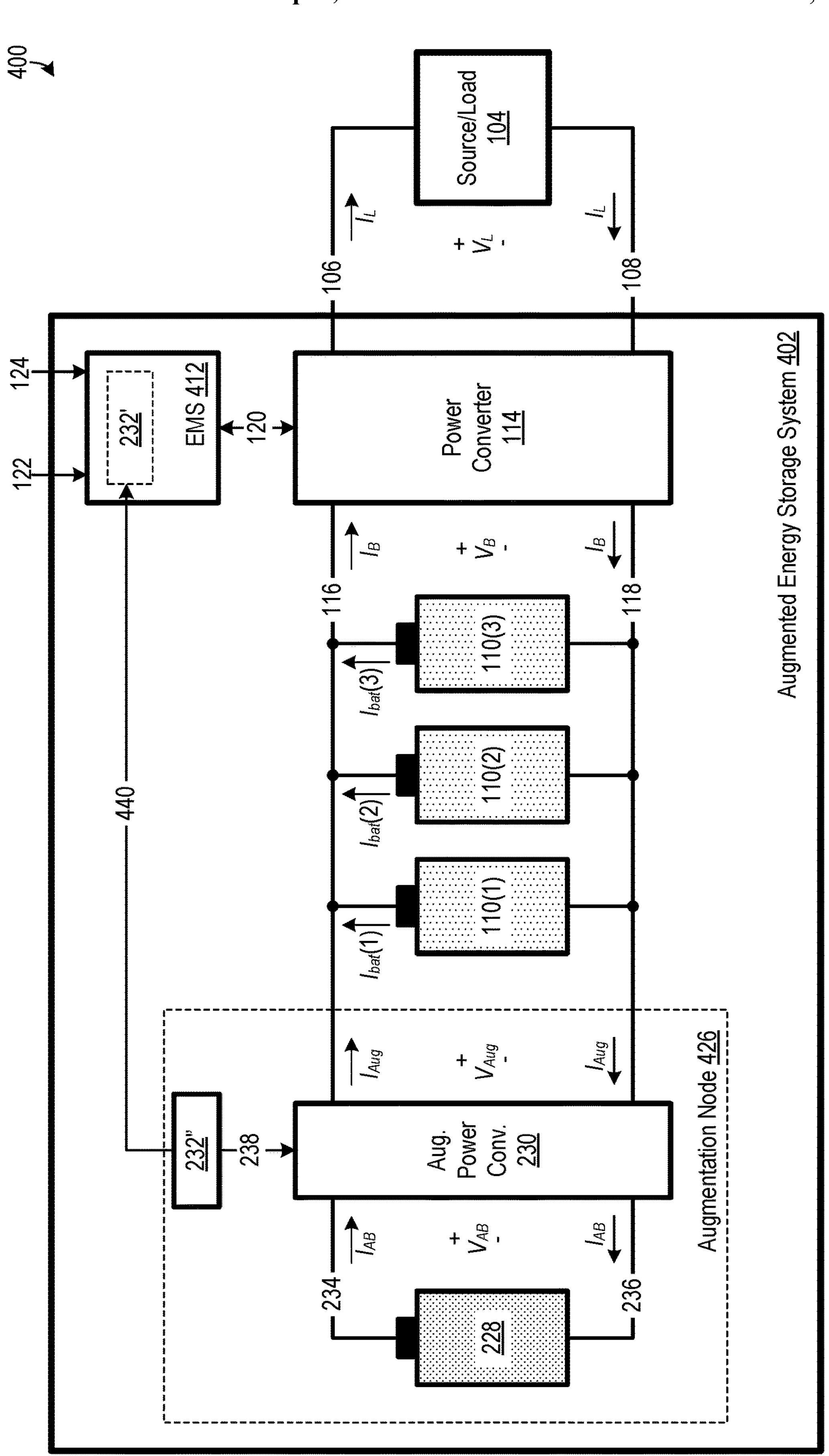
FIG. 4 is a block diagram of an alternate embodiment of the FIG. 2 electrical environment where an augmentation controller is split between an augmentation node and an EMS.

Referring again to FIG. 2, in some other alternate embodiments of augmented energy storage system 202, augmentation controller 232 is split between augmentation node 226 and EMS 112. For example, FIG. 4 is a block diagram of an electrical environment 400, which is an alternate embodiment of electrical environment 200 (FIG. 2) with augmented energy storage system 202 replaced with an augmented energy storage system 402. Augmented energy storage system 402 differs from augmented energy storage system 202 in that (a) augmentation node 226 is replaced with an augmentation node 426 and (b) EMS 112 is replaced with an EMS 412. Augmentation controller 232 is split into two portions, i.e., portions 232' and 232" that are communicatively coupled 440, in augmented energy storage system 402. Augmentation node 426 differs from augmentation node 226 in that augmentation node 226 includes only portion 232" of augmentation controller 232, and EMS 412 differs from EMS 112 in that EMS 412 further includes portion 232' of augmentation controller 232. As such, augmentation controller 232 is split between EMS 412 and augmentation node 426 in augmented energy storage system 402. Augmentation controller portion 232' is implemented, for example, by software, firmware, and/or hardware, in EMS 412.

Referring again to FIG. 2, in alternate embodiments of augmented energy storage system 202 including a plurality of augmentation nodes 226, such as discussed below with respect to FIGS. 17 and 18, multiple instances of augmentation nodes 226 optionally at least partially share a common augmentation controller 232. Furthermore, in certain alternate embodiments of augmented energy storage system 202, augmentation controller 232 is at least partially external to augmented energy storage system 202. For example, in particular alternate embodiments, augmentation controller 232 is at least partially implemented in a distributed computing system, such as in a cloud computing system, external to augmented energy storage system 202.

Augmentation controller 232 is configured to control operation of augmentation power converter 230 such that augmentation battery 228 augments batteries 110 by delivering additional energy to source/load 104 and/or by storing additional energy received by augmented energy storage system 202 from source/load 104. As such, particular embodiments of augmentation node 226 at least partially compensate for decrease in capacity of batteries 110 resulting from degradation of batteries 110, thereby potentially enabling augmented energy storage system 202 to operate at its rated capacity even if batteries 110 are degraded. For example, in certain embodiments, augmentation controller 232 is configured to control operation of augmentation power converter 230 at least partially based on state of health of batteries 110, to compensate for decrease in state of health of batteries 110, where state of health of batteries 110 includes a relationship between a present capacity of batteries 110 and an original capacity of batteries 110. For example, state of health of a battery 110 may be defined as a ratio of present capacity of the battery to original capacity of the battery. Additionally, in certain embodiments, augmentation controller 232 is configured to control operation of augmentation power converter 230 so that state of charge of augmentation battery 228 tracks state of charge of batteries 110. Discussed below are several examples of possible operating methods of augmentation node 226. It is understood, though, that augmentation node 226 is not limited to operating according to the example methods discussed below. Furthermore, some embodiments of augmentation controller 232 are configured to select between two or more of the example operating methods discussed below, such as based on operating conditions of augmented energy storage system 202, operating conditions of source/load 104, environmental considerations (e.g., weather), economic considerations (e.g., cost of electric power at source/load 104), etc.

Certain embodiments of augmentation controller 232 are configured to control augmentation power converter 230 to regulate magnitude of current $I_{Aug}$ flowing between (a) augmentation power converter 230 and (b) first battery power bus 116 and second battery power bus 118, at least partially based on state of health of batteries 110. For example, in some embodiments, augmentation controller 232 controls augmentation power converter 230 such that magnitude of current $I_{Aug}$ increases with decreasing capacity of batteries 110, which causes augmentation node 226 to at least partially compensate for loss of capacity of batteries 110. For instance, certain embodiments of augmentation controller 232 are configured to determine magnitude of current $I_{Aug}$ according to EQN. 1 below, where $\overline{I_{bat}}$ is an average magnitude of currents $I_{bat}$ flowing through batteries 110, $\overline{C_{pres}}$ is average present capacity of batteries 110, $\overline{C_{orig}}$ is average original capacity of batteries 110, and SOH is a ratio of $\overline{C_{pres}}$ to $\overline{C_{orig}}$. Augmentation controller 232, for example, receives one or more of $\overline{C_{pres}}$, $\overline{C_{pres}}$, $\overline{C_{orig}}$, and SOH from EMS 112 (or another source), and/or augmentation controller 232 receives data from EMS 112 (or another source) that enables augmentation controller 232 to determine one or more of $\overline{C_{pres}}$, $\overline{C_{pres}}$, $\overline{C_{orig}}$, and SOH.

$$I_{Aug} = \overline{I_{bat}} \cdot \frac{1}{SOH} = \overline{I_{bat}} \cdot \left[\overline{C_{orig}} / \overline{C_{pres}}\right] \quad \text{(EQN. 1)}$$

Figures 5, 6, 7, 8:
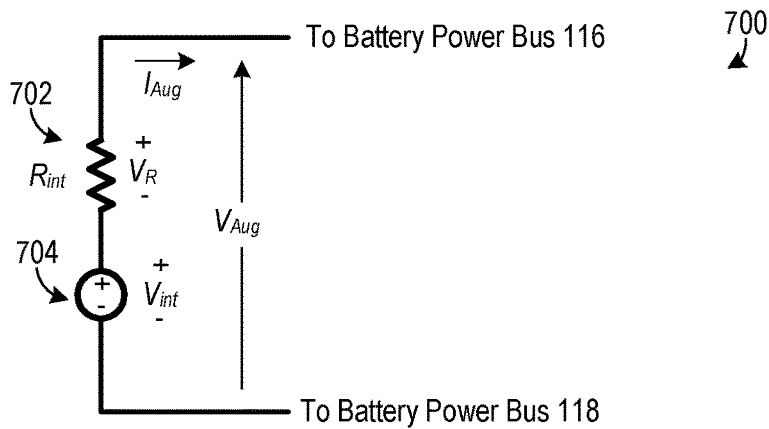
FIG. 5 is a chart illustrating one example of original capacities and present capacities of batteries of the FIG. 2 energy storage system.
FIG. 6 is a chart illustrating another example of original capacities and present capacities of the batteries of the FIG. 2 energy storage system.
FIG. 7 is an electrical model of an augmentation power converter, from a perspective of the batteries of the FIG. 2 energy storage system, according to an embodiment.
FIG. 8 is a chart illustrating another example of original capacities and present capacities of the batteries of the FIG. 2 energy storage system.

As one example of use of EQN. 1 by augmentation controller 232, consider a chart 500 of FIG. 5, which shows one example of original capacities of batteries 110 and present (degraded) capacities of batteries 110. $\overline{C_{orig}}$ is 4.0 MWh and $\overline{C_{pres}}$ is 3.0 MWh in the example scenario of chart 500, and augmentation controller 232 may therefore execute EQN. 2 below to determine that $I_{Aug}$ is 4/3 of the average magnitude of currents $I_{bat}$. In this example scenario, augmentation controller 232 then controls augmentation power converter 230 such that $I_{Aug}=(4/3)(\overline{I_{bat}})$, and augmentation node 226 thereby compensates for loss of capacity of batteries 110 by regulating magnitude of current flowing from augmentation node 226 to first and second battery power buses 116 and 118.

$$I_{Aug} = \overline{I_{bat}} \cdot [4.0 \text{ MWh}/3.0 \text{ MWh}] = \left(\frac{4}{3}\right) \cdot \overline{I_{bat}} \quad \text{(EQN. 2)}$$

Additionally, some embodiments of augmentation controller 232 are configured to control augmentation power converter 230 to regulate magnitude of power ($P_{Aug}$) flowing between (a) augmentation power converter 230 and (b) first battery power bus 116 and second battery power bus 118, at least partially based on state of health of batteries 110, where $P_{Aug}=(V_{Aug})(I_{Aug})$. For example, in some embodiments, augmentation controller 232 controls augmentation power converter 230 such that magnitude of power $P_{Aug}$ increases with decreasing capacity of batteries 110, which causes augmentation node 226 to at least partially compensate for loss of capacity of batteries 110. For instance, certain embodiments of augmentation controller 232 are configured to determine magnitude of power $P_{Aug}$ according to EQN. 3 below, where $\overline{P_{bat}}$ is an average magnitude of respective power contributions $P_{bat}$ of batteries 110 to source/load 104, $\overline{C_{pres}}$ is average present capacity of batteries 110, $\overline{C_{orig}}$ is average original capacity of batteries 110, SOH is a ratio of $\overline{C_{pres}}$ to $\overline{C_{orig}}$, and the respective power contribution $P_{bat}$ of each battery is given by a product of current $I_{bat}$ flowing through the battery and voltage $V_B$. Augmentation controller 232, for example, receives one or more of $\overline{P_{bat}}$, $\overline{C_{pres}}$, $\overline{C_{orig}}$, and SOH from EMS 112 (or another source), and/or augmentation controller 232 receives data from EMS 112 (or another source) that enables augmentation controller 232 to determine one or more of $\overline{P_{bat}}$, $\overline{C_{pres}}$, $\overline{C_{orig}}$, and SOH.

$$P_{Aug} = \overline{P_{bat}} \cdot \frac{1}{SOH} = \overline{I_{bat}} \cdot [\overline{C_{orig}}/\overline{C_{pres}}] \quad \text{(EQN. 3)}$$

As one example of use of EQN. 3 by augmentation controller 232, consider a chart 600 of FIG. 6, which shows another example of original capacities of batteries 110 and present (degraded) capacities of batteries 110. $\overline{C_{orig}}=4.0$ MWh and $\overline{C_{pres}}=3.2$ MWh in the example scenario of chart 600, and augmentation controller 232 may therefore execute EQN. 4 below to determine that $P_{Aug}$ is 4.0/3.2 of the average magnitude of powers $P_{bat}$. In this example scenario, augmentation controller 232 then controls augmentation power converter 230 such that $P_{Aug}=(4.0/3.2)(\overline{P_{bat}})$, and augmentation node 226 thereby compensates for loss of capacity of batteries 110 by regulating magnitude of power flowing from augmentation node 226 to first and second battery power buses 116 and 118.

$$P_{Aug} = \overline{P_{bat}} \cdot [4.0 \text{ MWh}/3.2 \text{ MWh}] = \left(\frac{4.0}{3.2}\right) \cdot \overline{P_{bat}} \quad \text{(EQN. 4)}$$

Furthermore, particular embodiments of augmentation controller 232 are configured to control augmentation power converter 230 to regulate an impedance $R_{int}$ of augmentation node 226 as a function of respective impedances of batteries 110, at least partially based on state of health of batteries 110. FIG. 7 is an electrical model 700 of augmentation power converter 230 from a perspective of batteries 110. Electrical model 700 includes an impedance element 702 electrically coupled in series with an ideal voltage source 704 between first battery power bus 116 and second battery power bus 118. Impedance element 702 has an impedance of $R_{int}$, ideal voltage source 704 has a voltage $V_{int}$ and ideal voltage source 704 has an impedance of zero. Therefore, impedance $R_{int}$ of augmentation node 226 is equal to $V_{Aug}/I_{Aug}$, and impedance $R_{int}$ is an impedance of augmentation node 226 as seen from a perspective of batteries 110. Voltage $V_{Aug}$ is equal to the sum of voltage $V_{int}$ plus a voltage $V_R$ across impedance element 702.

Augmentation power converter 230 regulates impedance $R_{int}$ of augmentation node 226, for example, by regulating $I_{Aug}$ because magnitude of $V_{Aug}$ is constrained to being equal to voltage $V_B$. Accordingly, $V_{int}$ is equal to $V_{Aug}-V_R$. For example, in some embodiments, augmentation controller 232 controls augmentation power converter 230 such that impedance $R_{int}$ decreases with decreasing capacity of batteries 110, which causes augmentation node 226 to at least partially compensate for loss of capacity of batteries 110. For instance, certain embodiments of augmentation controller 232 are configured to determine impedance $R_{int}$ according to EQN. 5 below, where $\overline{R_{bat}}$ is an average value of respective impedances $R_{bat}$ of batteries 110, $\overline{C_{pres}}$ is average present capacity of batteries 110, $\overline{C_{orig}}$ is average original capacity of batteries 110, SOH is a ratio of $\overline{C_{pres}}$ to $\overline{C_{orig}}$, and the respective impedance $R_{bat}$ of each battery 110 is given by the quotient of voltage $V_B$ divided by current $I_{bat}$ flowing through the battery. It should be noted that $R_{int}$ is a function of state of charge of augmentation battery 228, and $R_{bat}$ is a function of state of charge of batteries 110, due to battery impedance varying according to battery state of charge. Augmentation controller 232, for example, receives one or more of $\overline{R_{bat}}$, $\overline{C_{pres}}$, $\overline{C_{orig}}$, and SOH from EMS 112 (or another source), and/or augmentation controller 232 receives data from EMS 112 (or another source) that enables augmentation controller 232 to determine one or more of $\overline{R_{bat}}$, $\overline{C_{pres}}$, $\overline{C_{orig}}$, and SOH.

$$R_{int}(SOC) = \overline{R_{bat}}(SOC) \cdot SOH = \overline{R_{bat}}(SOC) \cdot [\overline{C_{pres}}/\overline{C_{orig}}] \quad \text{(EQN. 5)}$$

As one example of use of EQN. 5 by augmentation controller 232, consider a chart 800 of FIG. 8, which shows an additional example of original capacities of batteries 110 and present (degraded) capacity of batteries 110. $\overline{C_{orig}}=3.0$ MWh and $\overline{C_{pres}}=2.7$ MWh in the example scenario of chart 800, and augmentation controller 232 may therefore execute EQN. 6 below to determine that $R_{int}$ is 2.7/3.0 of the average value of impedance $R_{bat}$. In this example scenario, augmentation controller 232 then controls augmentation power converter 230 such that $R_{int}=(2.7/3.0)(\overline{R_{bat}})$, and augmentation node 226 thereby compensates for loss of capacity of batteries 110 by regulating impedance of augmentation node 226 from the perspective of batteries 110.

$$R_{int}(SOC) = \overline{R_{bat}}(SOC)\cdot[2.7\text{ MWh}/3.0\text{ MHh}] = \left(\frac{2.7}{3.0}\right)\cdot\overline{R_{bat}}(SOC) \quad \text{(EQN. 6)}$$

As discussed above, some embodiments of augmentation controller 232 are configured to control operation of augmentation power converter 230 so that state of charge of augmentation battery 228 tracks state of charge of batteries 110, e.g., (a) so that augmentation battery 228 reaches its minimum state of charge at least substantially at the same time that batteries 110 reach their minimum state of charge and/or (b) so that augmentation battery 228 reaches its maximum state of charge at least substantially at the same time that batteries 110 reach their maximum state of charge. For example, some embodiments of augmentation controller 232 are configured to control augmentation power converter 230 by iteratively changing magnitude of $I_{Aug}$, $P_{Aug}$, $R_{int}$, and/or $V_{int}$ to decrease a difference between (a) state of charge of batteries 110 and (b) state of charge of augmentation battery 228, to cause state of charge of augmentation battery 228 to at least substantially converge to state of charge of batteries 110. Discussed below with respect to FIGS. 9-12 are several examples of how certain embodiments of augmentation node 226 may track state of charge of batteries 110. It is understood, though, that augmentation node 226 may be configured to track state of charge of batteries 110 in other manners without departing from the scope hereof.

Figure 9:
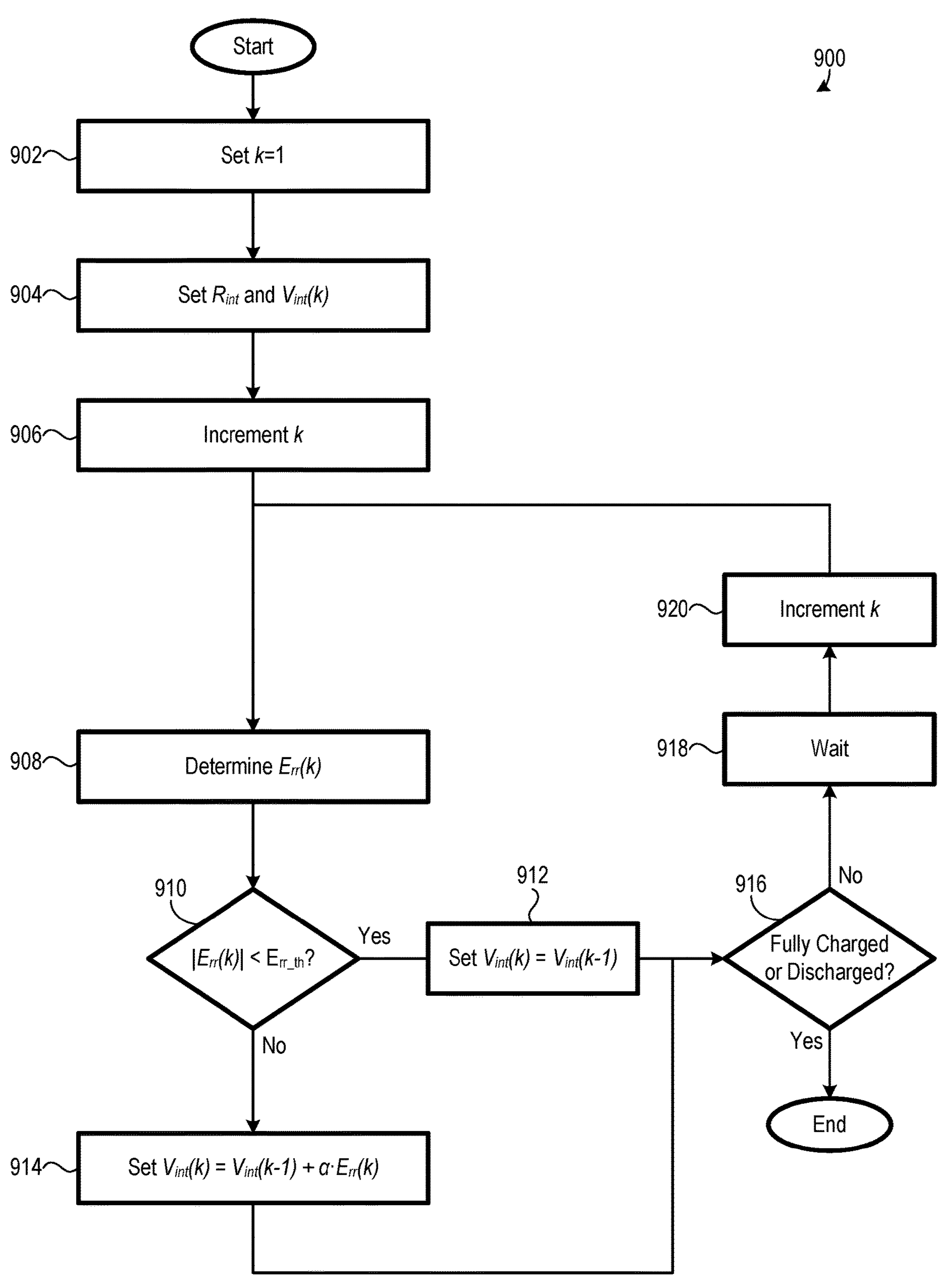
FIG. 9 is a flow chart of a method for tracking state of charge of batteries in the augmented energy storage system of FIG. 2, according to an embodiment.

FIG. 9 is a flow chart of a method 900 for tracking state of charge of batteries, which is one example of how augmentation node 226 may track state of charge of batteries 110. In a block 902 of method 900, augmentation controller 232 sets an iteration index k of method 900 to 1. Method 900 proceeds from block 902 to a block 904, where augmentation controller 232 sets $R_{int}$ and an initial value of $V_{int}(k)$, i.e., $V_{int}(k=1)$. In one example of block 904, augmentation controller 232 sets $R_{int}$ using EQN. 5 above, and augmentation controller 232 sets voltage $V_{int}(k)$ such that $V_{int}(k)=V_B-V_R$. Method 900 proceeds to a block 906 where augmentation controller 232 increments iteration index k, i.e., augmentation controller 232 increases the value of iteration index k by one.

A block 908 follows block 906 in method 900, and augmentation controller 232 determines in block 908 an error term $E_{rr}(k)$, which represents a difference between state of charge of augmentation battery 228 and state of charge of batteries 110. For example, in particular embodiments, augmentation controller 232 executes EQN. 7 below to determine error term $E_{rr}(k)$, where $SOC_{Aug}(k)$ is state of charge of augmentation battery 228 at the current iteration of method 900 and $\overline{SOC_{bat}}(k)$ is an average state of charge of batteries 110 at the current iteration of method 900. $SOC_{Aug}(k)$ in EQN. 7 is replaced with $\overline{SOC_{Aug}}(k)$, which is average state of charge of all augmentation batteries 228, in alternate embodiments of augmentation node 226 including a plurality of augmentation batteries 228 (such as discussed below with respect to FIGS. 15 and 16), or in alternate embodiments of augmented energy storage system 202 including a plurality of augmentation nodes 226 (such as discussed below with respect to FIGS. 17 and 18).

$$E_{rr}(k) = SOC_{Aug}(k) - \overline{SOC_{bat}}(k) \quad \text{(EQN. 7)}$$

Method 900 proceeds from block 908 to a decision block 910 where augmentation controller 232 determines whether an absolute value of error term $E_{rr}(k)$ is less than an error threshold value $E_{rr\_th}$, where error threshold value $E_{rr\_th}$ is a minimum value of error term $E_{rr}(k)$ required for augmentation controller 232 to change operation of augmentation power converter 230 for the purpose of tracking state of charge of batteries 110. If the result of decision block 910 is yes, method proceeds to a block 912 where voltage $V_{int}(k)$ of the present iteration of method 900 is set to voltage $V_{int}(k-1)$ of the previous iteration of method 900, such that the value of voltage $V_{int}$ does not change in the present iteration of method 900. On the flip side, if the result of decision block 910 is no, method 900 proceeds to a block 914 where augmentation controller 232 sets voltage $V_{int}(k)$ according to EQN. 8 below, where voltage $V_{int}(k-1)$ is the value of voltage $V_{int}$ during a previous iteration of method 900 and a is a gain factor. Such change to voltage $V_{int}$ in block 914 helps shifts state of charge of augmentation battery 228 closer to state of charge of batteries 110. Gain factor $\alpha$ is chosen, for example, to achieved a desired balance between (a) speed at which state of charge of augmentation battery 228 converges to state of charge of batteries 110 and (b) smooth operation of augmented energy storage system 202. It should be noted that error term $E_{rr}(k)$ may be negative, i.e., error term $E_{rr}(k)$ is negative if the average state of charge of batteries 110 is greater than the state of charge of augmentation battery 228.

$$V_{int}(k) = V_{int}(k-1) + \alpha\cdot E_{rr}(k) \quad \text{(EQN. 8)}$$

Each of blocks 912 and 914 proceeds to a decision block 916, where augmentation controller 232 determine whether batteries 110 are fully charged or discharged. If the result of decision block 916 is yes, batteries 110 have completed either their charging or discharging process, and method 900 accordingly ends. If the result of decision step 916 is no, batteries 110 are still charging or discharging, and method 916 therefore proceeds to a block 918 where method 900 waits a predetermined time equal to a desired time between successive iterations of method 900. Method proceeds from block 918 to a block 920 where augmentation controller 232 increments iteration index k, i.e., augmentation controller 232 increases the value of iteration index k by one, and method 900 then returns to block 908.

Figure 10:
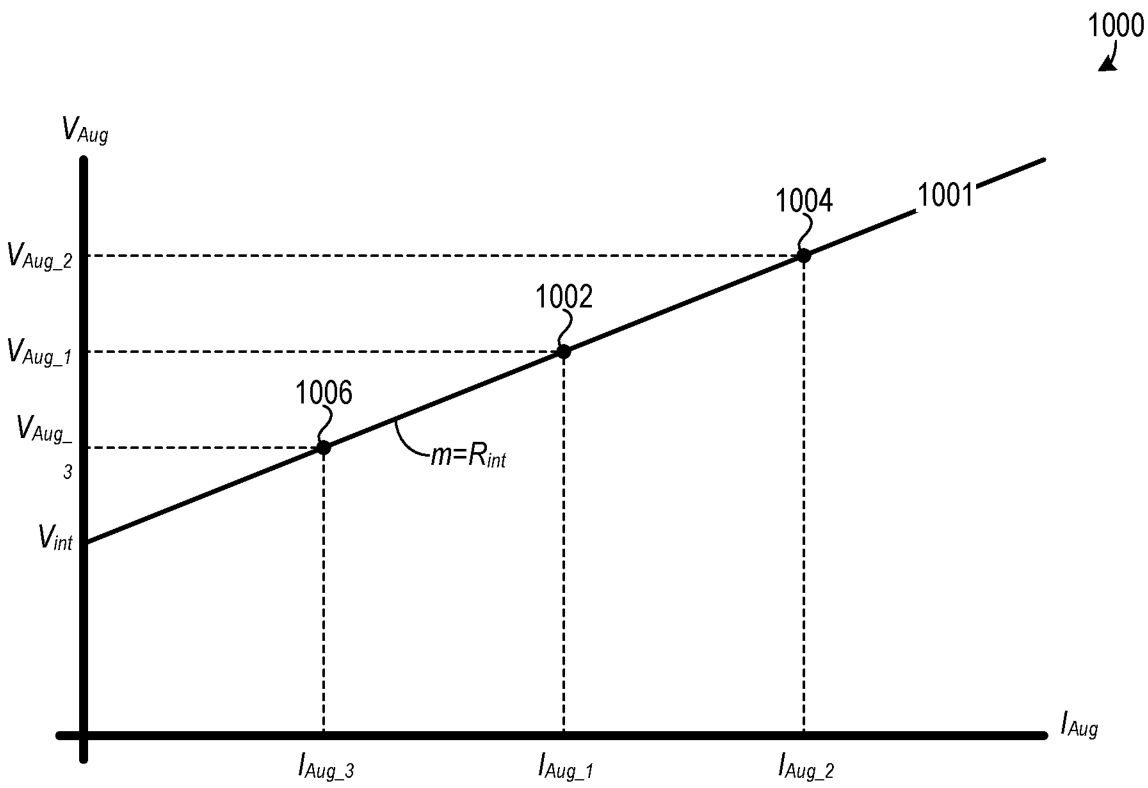
FIG. 10 is a graph of voltage versus current illustrating one example of operation of the FIG. 2 augmented energy storage system between successive iterations of the FIG. 9 method.

Method 900 advantageously enables augmentation node 226 to maintain a proportional share of energy exchange between augmented energy storage system 202 and source/load 104 during changes in operating point of source/load 104 that occur between iterations of method 900. For example, FIG. 10 is a graph 1000 of voltage versus current illustrating one example of operation of augmented energy storage system 202 between successive iterations of method 900 where $V_{int}$ is constant. Graph 1000 includes a curve 1001 representing a relationship between voltage $V_{Aug}$ and current $I_{Aug}$. Curve 1001 has a slope (m) equal $R_{int}$, and curve 1001 has a y-intercept equal to voltage $V_{int}$. Voltage $V_{Aug}$ initially has a magnitude of $V_{Aug\_1}$ which intersects curve 1001 at a point 1002, resulting in current $I_{Aug}$ having a magnitude of $I_{Aug\_1}$. Magnitude of voltage $V_{Aug}$ subsequently increases to $V_{Aug\_2}$, such as due to a change in operation of source/load 104, which intersects curve 1001 at a point 1004, resulting in current $I_{Aug}$ having a magnitude of $I_{Aug\_2}$. As such, magnitude of current $I_{Aug}$ increases with increasing magnitude of voltage $V_{Aug}$ (and with increasing magnitude of voltage $V_B$ because $V_{Aug}=V_B$), and augmentation node 226 thereby maintains a proportional share of energy exchanged between augmented energy storage system 202 and source/load 104. Magnitude of voltage $V_{Aug}$ next decreases to $V_{Aug\_3}$, such as due to another change in operation of source/load 104, which intersects curve 1001 at a point 1006, resulting in current $I_{Aug}$ having a magnitude of $I_{Aug\_3}$. As such, magnitude of current $I_{Aug}$ decreases with decreasing magnitude of voltage $V_B$ (and with decreasing magnitude of voltage $V_B$ because $V_{Aug}=V_B$), and augmentation node 226 thereby maintains a proportional share of energy exchanged between augmented energy storage system 202 and source/load 104. While the example of graph 1000 assumes that augmented energy storage system 202 is providing energy to source/load 104, augmentation node 226 would operate in an analogous manner if the example of graph 1000 is modified such that augmented energy storage system 202 receives energy from source/load 104, i.e., such that $I_{Aug}$ is negative instead of positive.

Figure 11:
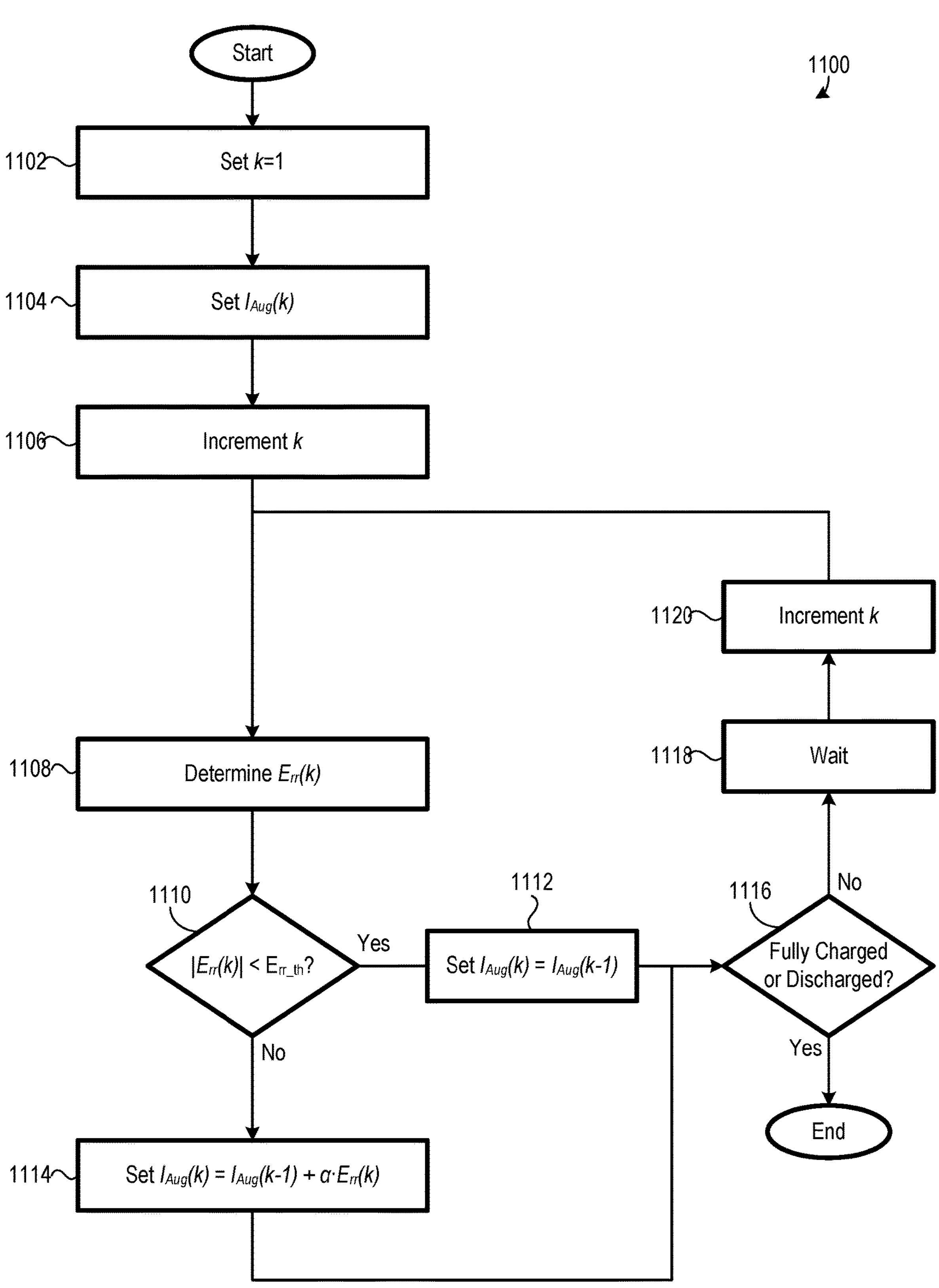
FIG. 11 is a flow chart of another method for tracking state of charge of batteries in the augmented energy storage system of FIG. 2, according to an embodiment.

Referring again to FIG. 9, method 900 may be modified so that augmentation controller 232 adjusts a parameter of augmentation node 226 other than $R_{int}$ so that state of charge of augmentation battery 228 tracks state of charge of batteries 110. For example, FIG. 11 is a flow chart of a method 1100 for tracking state of charge of batteries, which is an alternate embodiment of method 900 (FIG. 9) where augmentation controller 232 adjusts magnitude of current $I_{Aug}$, instead of magnitude of voltage $V_{int}$, to cause state of charge of augmentation battery 228 to track state of charge of batteries 110. In a block 1102 of method 1100, augmentation controller 232 sets an iteration index k of method 1100 to 1. Method 1100 proceeds from block 1102 to a block 1104, where augmentation controller 232 sets $I_{Aug}$ to an initial value of $I_{Aug}$(k), i.e., $I_{Aug}$(k=1). In one example of block 1104, augmentation controller 232 sets $I_{Aug}$ using EQN. 1 above. Method 1100 proceeds to a block 1106 where augmentation controller 232 increments iteration index k, i.e., augmentation controller 232 increases the value of iteration index k by one.

A block 1108 follows block 1106 in method 1100, and augmentation controller 232 determines in block 1108 an error term $E_{rr}$(k), which represents a difference between state of charge of augmentation battery 228 and state of charge of batteries 110. For example, in a particular embodiment, augmentation controller 232 executes EQN. 7 above to determine error term $E_{rr}$(k). Method 1100 proceeds from block 1108 to a decision block 1110 where augmentation controller 232 determines whether an absolute value of error term $E_{rr}$(k) is less than error threshold value $E_{rr\_th}$, where $E_{rr\_th}$ is the same as discussed above with respect to FIG. 9. If the result of decision block 1110 is yes, method proceeds to a block 1112 where current $I_{Aug}$(k) of the present iteration of method 1100 is set to current $I_{Aug}$(k−1) of the previous iteration of method 1100, such that the value of current $I_{Aug}$ does not change. On the flip side, if the result of decision block 1110 is no, method 1100 proceeds to a block 1114. In block 1114, augmentation controller 232 sets current $I_{Aug}$(k) according to EQN. 9 below, where current $I_{Aug}$(k−1) is the value of current $I_{Aug}$ during a previous iteration of method 1100 and a is a gain factor as discussed above with respect to FIG. 9. Such change to current $I_{Aug}$ in block 1114 helps shifts state of charge of augmentation battery 228 closer to state of charge of batteries 110. Similar to as discussed above with respect to FIG. 9, error term $E_{rr}$(k) may be negative.

$$I_{Aug}(k) = I_{Aug}(k-1) + \alpha \cdot E_{rr}(k) \quad \text{(EQN. 9)}$$

Method 1100 further includes blocks 1116, 1118, and 1120 which are performed by augmentation controller 232 in the same manner as blocks 916, 918, and 920, of FIG. 9, respectively. Accordingly, blocks 1116, 1118, and 1120 are not discussed further.

Figure 12:
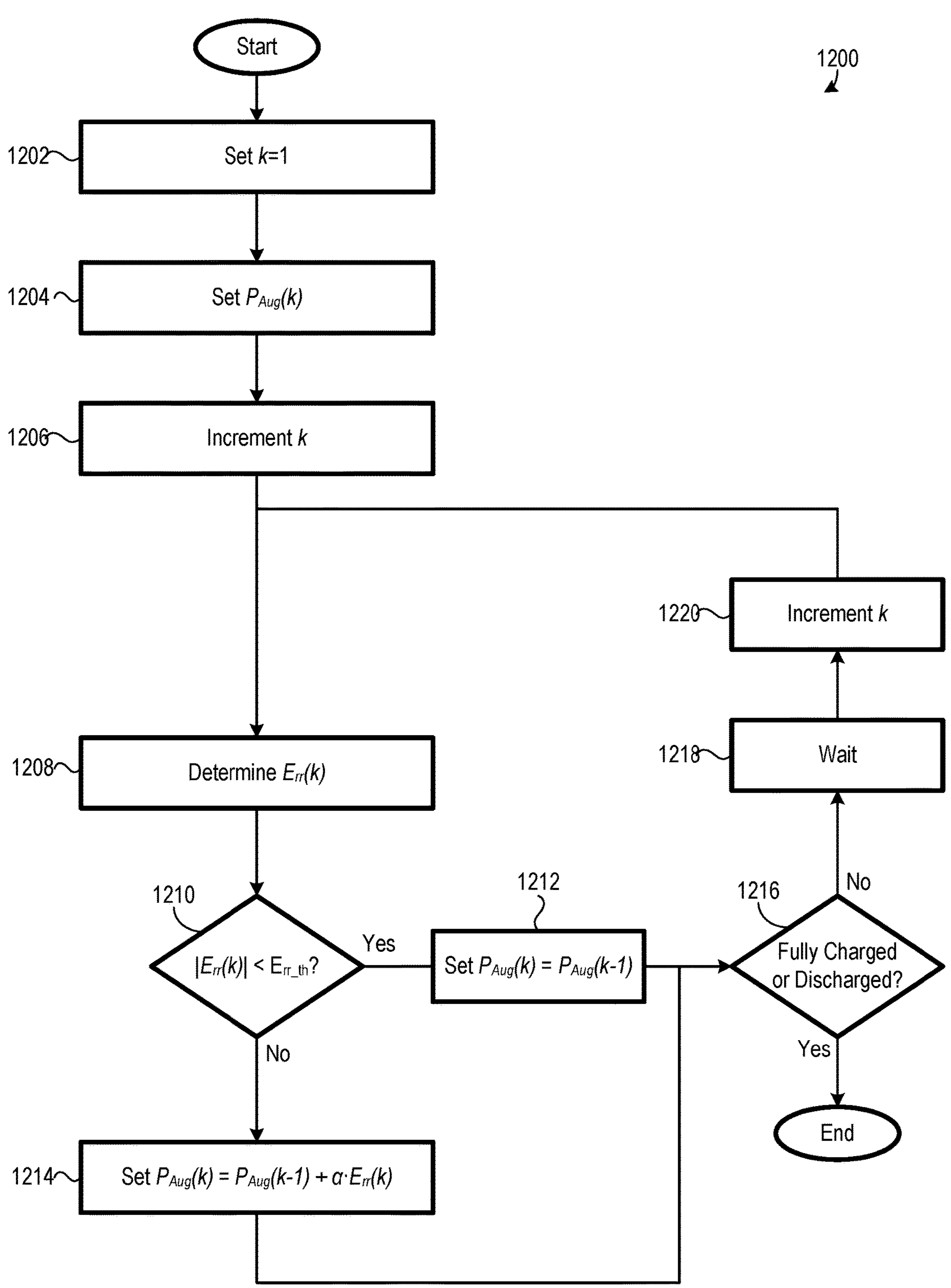
FIG. 12 is a flow chart of an additional method for tracking state of charge of batteries in the augmented energy storage system of FIG. 2, according to an embodiment.

FIG. 12 is a flow chart of a method 1200 for tracking state of charge of batteries, which is an alternate embodiment of method 900 (FIG. 9) where augmentation controller 232 adjusts magnitude of power $P_{Aug}$, instead of magnitude of voltage $V_{int}$, to cause state of charge of augmentation battery 228 to track state of charge of batteries 110. In a block 1202 of method 1100, augmentation controller 232 sets an iteration index k of method 1200 to 1. Method 1200 proceeds from block 1202 to a block 1204, where augmentation controller 232 sets $P_{Aug}$ to an initial value of $P_{Aug}$(k), i.e., $P_{Aug}$(k=1). In one example of block 1204, augmentation controller 232 sets $P_{Aug}$ using EQN. 3 above. Method 1200 proceeds to a block 1206 where augmentation controller 232 increments iteration index k, i.e., augmentation controller 232 increases the value of iteration index k by one.

A block 1208 follows block 1206 in method 1200, and augmentation controller 232 determines in block 1208 an error term $E_{rr}$(k), which represents a difference between state of charge of augmentation battery 228 and state of charge of batteries 110. For example, in particular embodiments, augmentation controller 232 executes EQN. 7 above to determine error term $E_{rr}$(k). Method 1200 proceeds from block 1208 to a decision block 1210 where augmentation controller 232 determines whether an absolute value of error term $E_{rr}$(k) is less than error threshold value $E_{rr\_th}$, where $E_{rr\_th}$ is the same as discussed above with respect to FIG. 9. If the result of decision block 1210 is yes, method proceeds to a block 1212 where power $P_{Aug}$(k) of the present iteration of method 1200 is set to power $P_{Aug}$(k−1) of the previous iteration of method 1200, such that the value of power $P_{Aug}$ does not change. On the flip side, if the result of decision block 1210 is no, method 1200 proceeds to a block 1214. In block 1214, augmentation controller 232 sets power $P_{Aug}$(k) according to EQN. 10 below, where power $P_{Aug}$(k−1) is the value of power $P_{Aug}$ during a previous iteration of method 1200 and a is a gain factor as discussed above with respect to FIG. 9. Such change to power $P_{Aug}$ in block 1214 helps shifts state of charge of augmentation battery 228 closer to state of charge of batteries 110. Similar to as discussed above with respect to FIG. 9, error term $E_{rr}$(k) may be negative.

$$P_{Aug}(k) = P_{Aug}(k-1) + \alpha \cdot E_{rr}(k) \quad \text{(EQN. 10)}$$

Method 1200 further includes blocks 1216, 1218, and 1220 which are performed by augmentation controller 232 in the same manner as blocks 916, 918, and 920, of FIG. 9, respectively. Accordingly, blocks 1216, 1218, and 1220 are not discussed further.

Any of methods 900, 1100, and 1200 could be modified to determine error term $E_{rr}$(k) based on median state of charge of batteries 110, or another expression of collective state of charge of batteries 110. For example, in certain alternate embodiments of methods 900, 1100, and 1200, augmentation controller 232 determines error term $E_{rr}(k)$ based on EQN. 11 below, where $Mdn[SOC_{bat}(k)]$ is the median state of charge of batteries 110 at iteration index k. $SOC_{Aug}(k)$ in EQN. 11 is replaced with $Mdn[SOC_{Aug}(k)]$, which is median state of charge of augmentation batteries 228, in alternate embodiments of augmentation node 226 including a plurality of augmentation batteries 228 (such as discussed below with respect to FIGS. 15 and 16), or in alternate embodiments of augmented energy storage system 202 including a plurality of augmentation nodes 226 (such as discussed below with respect to FIGS. 17 and 18).

$$E_{rr}(k) = SOC_{Aug}(k) - Mdn[SOC_{bat}(k)] \quad \text{(EQN. 11)}$$

Referring again to FIG. 2, certain embodiments of augmentation node 226 further include current or power limiting capability, which limits maximum magnitude of $I_{Aug}$ or $P_{Aug}$, respectively. For example, in certain embodiments where augmentation controller 232 is configured to regulate or control magnitude of current $I_{Aug}$, such as discussed above with respect to FIG. 5 or 11, augmentation controller 232 is further configured to limit magnitude of $I_{Aug}$ to a predetermined maximum current value. As another example, in particular embodiments where augmentation controller 232 is configured to regulate or control magnitude of current $P_{Aug}$, such as discussed above with respect to FIG. 6 or 12, augmentation controller 232 is further configured to limit magnitude of $P_{Aug}$ to a predetermined maximum power value. As an additional example, in some embodiments where augmentation controller 232 is configured to regulate or control magnitude of impedance $R_{int}$ and voltage $V_{int}$, such as discussed above with respect to FIG. 8 or 9, augmentation controller 232 is further configured to adjust $V_{int}$ with respect to $V_B$ to limit current or power through impedance $R_{Aug}$.

Figure 13:
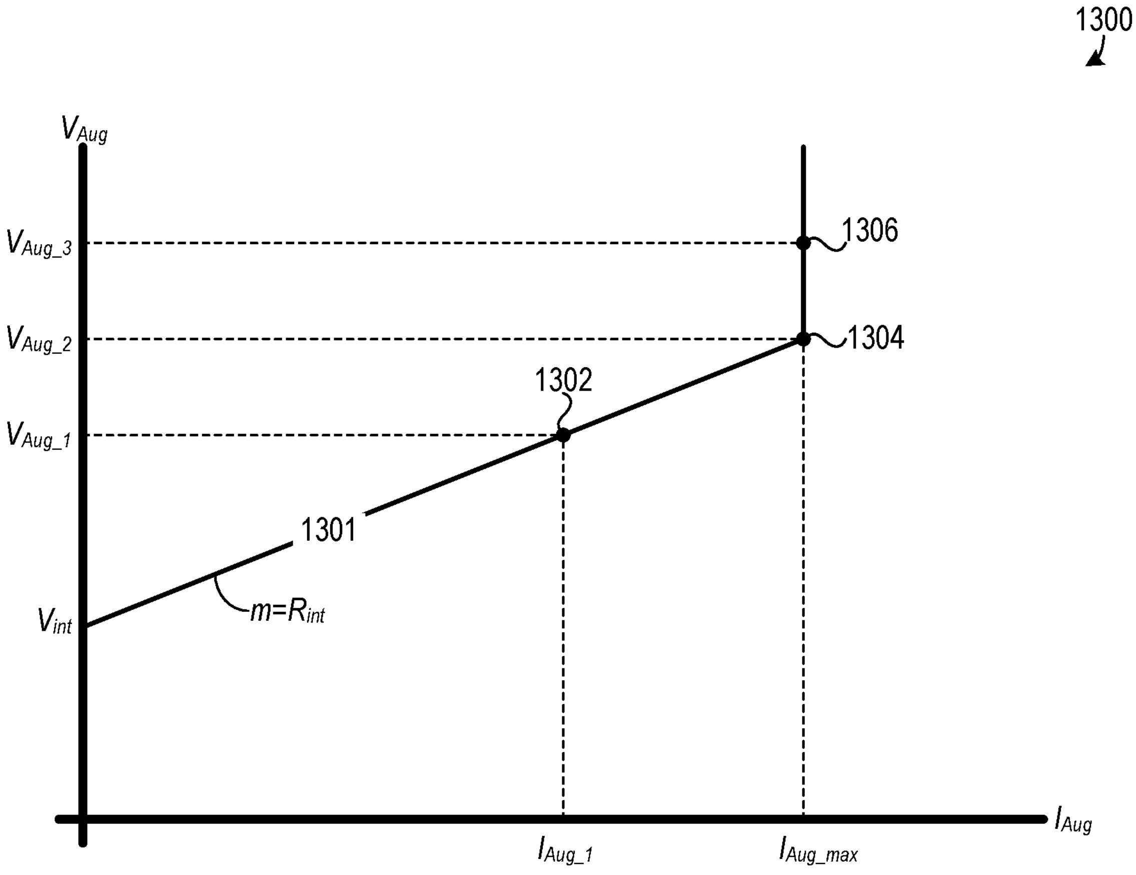
FIG. 13 is a graph of voltage versus current illustrating one example of operation of an embodiment of the FIG. 2 augmented energy storage system supporting current limiting.

For instance, FIG. 13 is a graph 1300 of voltage versus current illustrating one example of operation of augmented energy storage system 202 in an embodiment where augmentation controller 232 is configured to regulate impedance $R_{int}$ of augmentation node 226 and support current limiting. Graph 1300 includes a curve 1301 representing a relationship between voltage $V_{Aug}$ and current $I_{Aug}$. Curve 1301 has a slope (m) equal to $R_{int}$ as long as magnitude of current $I_{Aug}$ is less than or equal to $I_{Aug\_max}$, and curve 1301 has a y-intercept equal to voltage $V_{int}$. Voltage $V_{Aug}$ initially has a magnitude of $V_{Aug\_1}$ which intersects curve 1301 at a point 1302, resulting in current $I_{Aug}$ having a magnitude of $I_{Aug\_1}$. Magnitude of current $I_{Aug}$ increases with increasing magnitude of voltage $V_{Aug}$. However, in this embodiment, augmentation controller 232 is further configured to prevent magnitude of current $I_{Aug}$ from exceeding a maximum value of $I_{Aug\_max}$ by increasing magnitude of voltage $V_{int}$ in proportion to increase in voltage $V_{Aug}$ beyond voltage $V_{Aug\_2}$. Voltage $V_{Aug\_2}$ corresponds to $I_{Aug\_max}$, as shown by voltage $V_{Aug\_2}$ intersecting the $R_{int}$ curve at a point 1304. Consequently, curve 1301 has an infinite slope for magnitude of voltages $V_{Aug}$ exceeding voltage $V_{Aug\_2}$, which limits magnitude of current $I_{Aug}$ to $I_{Aug\_max}$. For example, if voltage $V_{Aug}$ has a magnitude of $V_{Aug\_3}$, magnitude of current $I_{Aug}$ is limited to $I_{Aug\_max}$, as shown by voltage $V_{Aug\_3}$ intersecting curve 1301 at a point 1306. It should be noted that while magnitude of current $I_{Aug}$ is limited in the example of FIG. 13, magnitude of $P_{Aug}$ is not limited because magnitude of voltage $V_{Aug}$ can continue to increase while magnitude of current $I_{Aug}$ is limited to $I_{Aug\_max}$.

Figure 14:
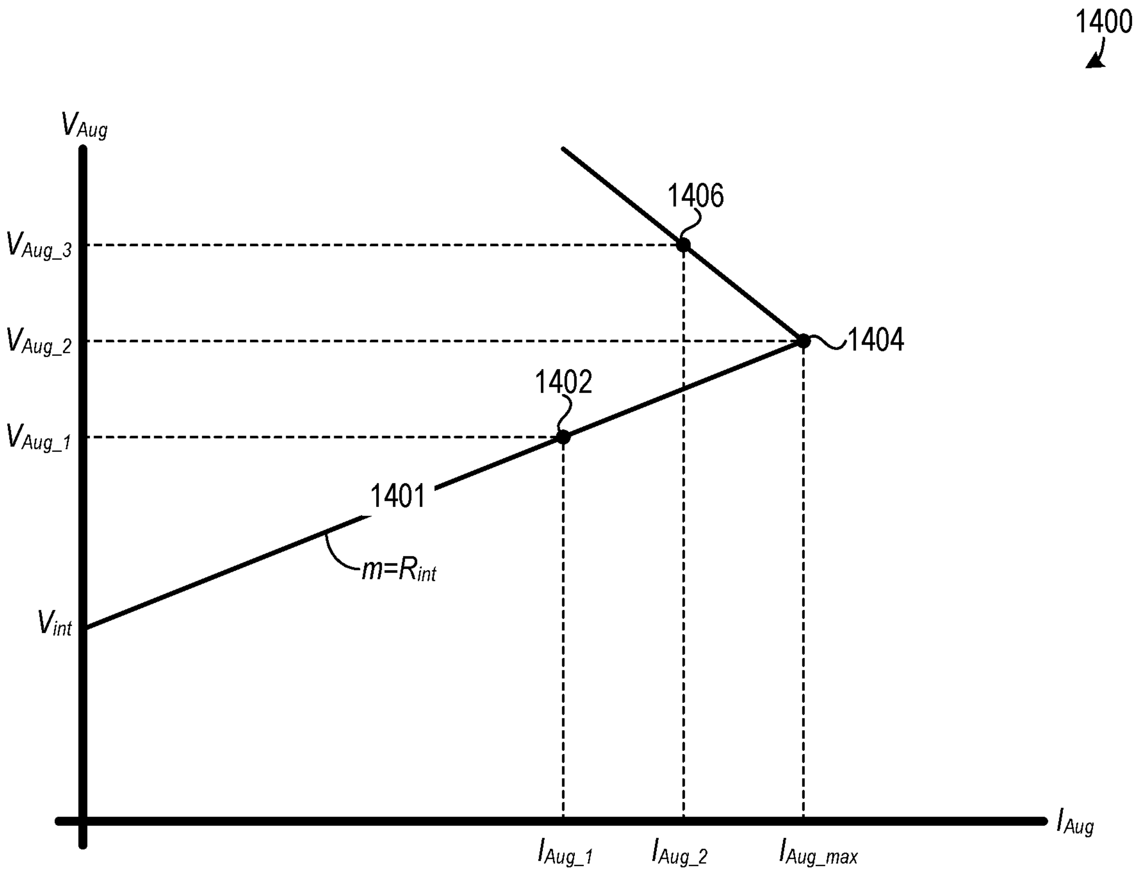
FIG. 14 is a graph of voltage versus current illustrating one example of operation of an embodiment of the FIG. 2 augmented energy storage system supporting power limiting.

FIG. 14 is a graph 1400 of voltage versus current illustrating one example of operation of augmented energy storage system 202 in an embodiment where augmentation controller 232 is configured to regulate impedance $R_{int}$ of augmentation node 226 and to support power limiting. Graph 1400 includes a curve 1401 representing a relationship between voltage $V_{Aug}$ and current $I_{Aug}$. Curve 1401 has a slope (m) equal to $R_{int}$ as long as magnitude of current $I_{Aug}$ is less than or equal to $I_{Aug\_max}$, and curve 1401 has a y-intercept equal to voltage $V_{int}$. Voltage $V_{Aug}$ initially has a magnitude of $V_{Aug\_1}$ which intersects curve 1401 at a point 1402, resulting in current $I_{Aug}$ having a magnitude of $I_{Aug\_1}$. Magnitude of current $I_{Aug}$ increases with increasing magnitude of voltage $V_{Aug}$. However, in this embodiment, augmentation controller 232 is further configured to prevent magnitude of power $P_{Aug}$ from exceeding a maximum value $P_{Aug\_max}$ equal to the product of $I_{Aug\_max}$ and $V_{Aug\_2}$ by increasing magnitude of voltage $V_{int}$, as voltage $V_{Aug}$ increases beyond voltage $V_{Aug\_2}$, such that curve 1401 changes direction when magnitude of voltage $V_{Aug}$ exceeds $V_{Aug\_2}$. Voltage $V_{Aug\_2}$ corresponds to $I_{Aug\_max}$, as shown by voltage $V_{Aug\_2}$ intersecting the $R_{int}$ curve at a point 1404, which correspond to $P_{Aug\_max}$. Consequently, $P_{Aug}$ is limited to $P_{Aug\_max}$ for voltages $V_{Aug}$ exceeding voltage $V_{Aug\_2}$. For example, if voltage $V_{Aug}$ has a magnitude of $V_{Aug\_3}$, magnitude of current $I_{Aug}$ is limited to $I_{Aug\_2}$, as shown by voltage $V_{Aug\_3}$ intersecting curve 1401 at a point 1406, which limits $P_{Aux}$ to $P_{Aux\_max}$.

Figure 15:
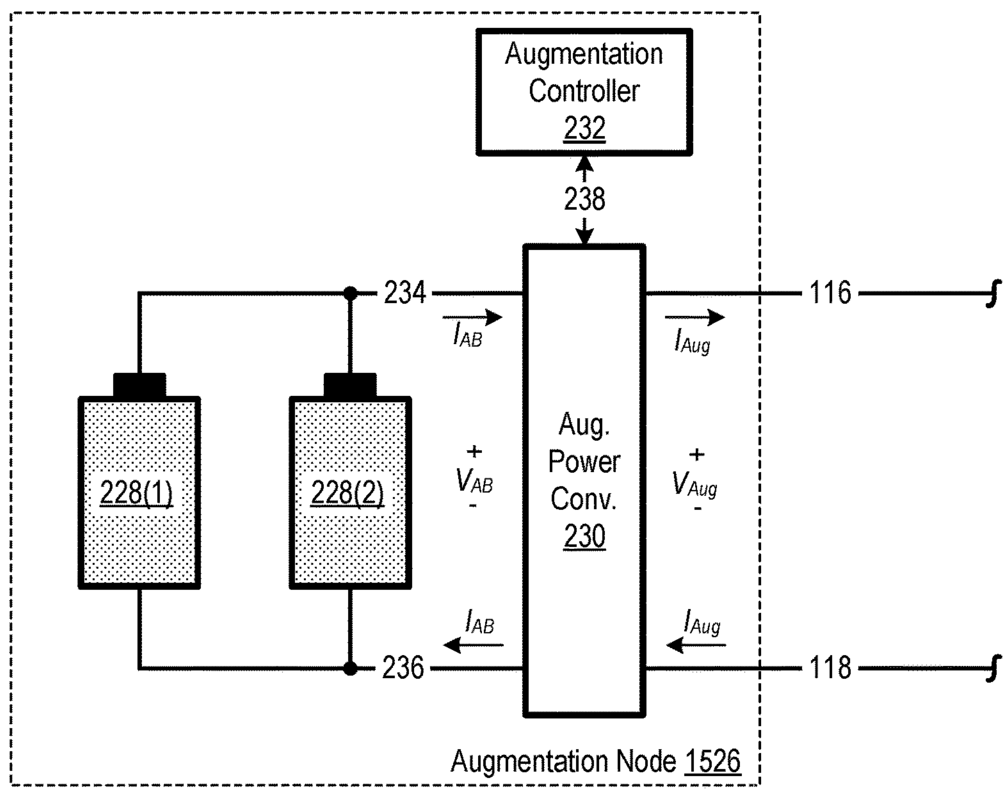
FIG. 15 is a block diagram of an alternate embodiment of an augmentation node of the FIG. 2 electrical environment including two augmentation batteries electrically coupled in parallel.

FIG. 15 is a block diagram of an augmentation node 1526, which is an alternate embodiment of augmentation node 226 (FIG. 2) including two augmentation batteries 228 electrically coupled in parallel between first augmentation power bus 234 and second augmentation power bus 236. Augmentation node 1526 could be modified to include additional instances of augmentation batteries 228 electrically coupled in parallel with augmentation batteries 228(1) and 228(2). Each instance of augmentation battery 228 in augmentation node 1526 need not have the same configuration. Current $I_{AB}$ in augmentation node 1526 is current flowing between all augmentation batteries 228 and augmentation power converter 230. Augmentation node 1526 could be modified to include two or more series strings of augmentation batteries 228 electrically coupled in parallel between first augmentation power bus 234 and second augmentation power bus 236, where each series string includes a plurality of augmentation batteries 228 electrically coupled in series within the string.

Figure 16:
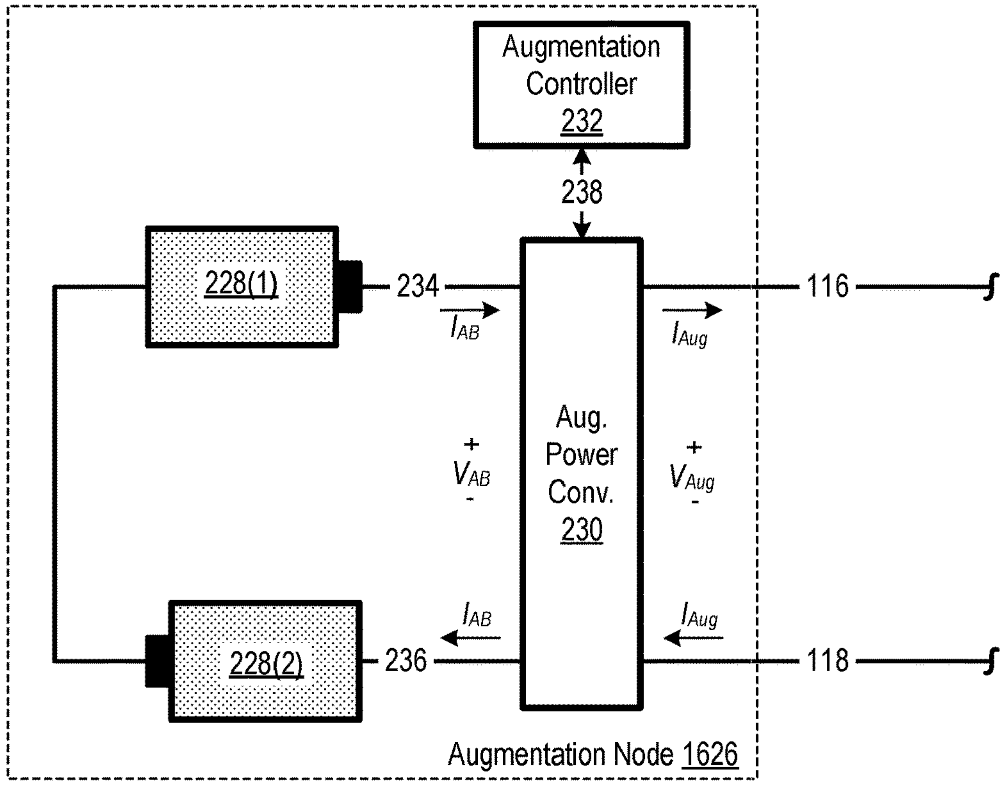
FIG. 16 is a block diagram of an alternate embodiment of an augmentation node of the FIG. 2 electrical environment including two augmentation batteries electrically coupled in series.

FIG. 16 is a block diagram of an augmentation node 1626, which is an alternate embodiment of augmentation node 226 (FIG. 2) including two augmentation batteries 228 electrically coupled in series between first augmentation power bus 234 and second augmentation power bus 236. Augmentation node 1626 could be modified to include additional instances of augmentation batteries 228 electrically coupled in series between first augmentation power bus 234 and second augmentation power bus 236. Voltage $V_{AB}$ in augmentation node 1626 is equal to the sum of voltages across the series combinations augmentation batteries 228.

Figure 17:
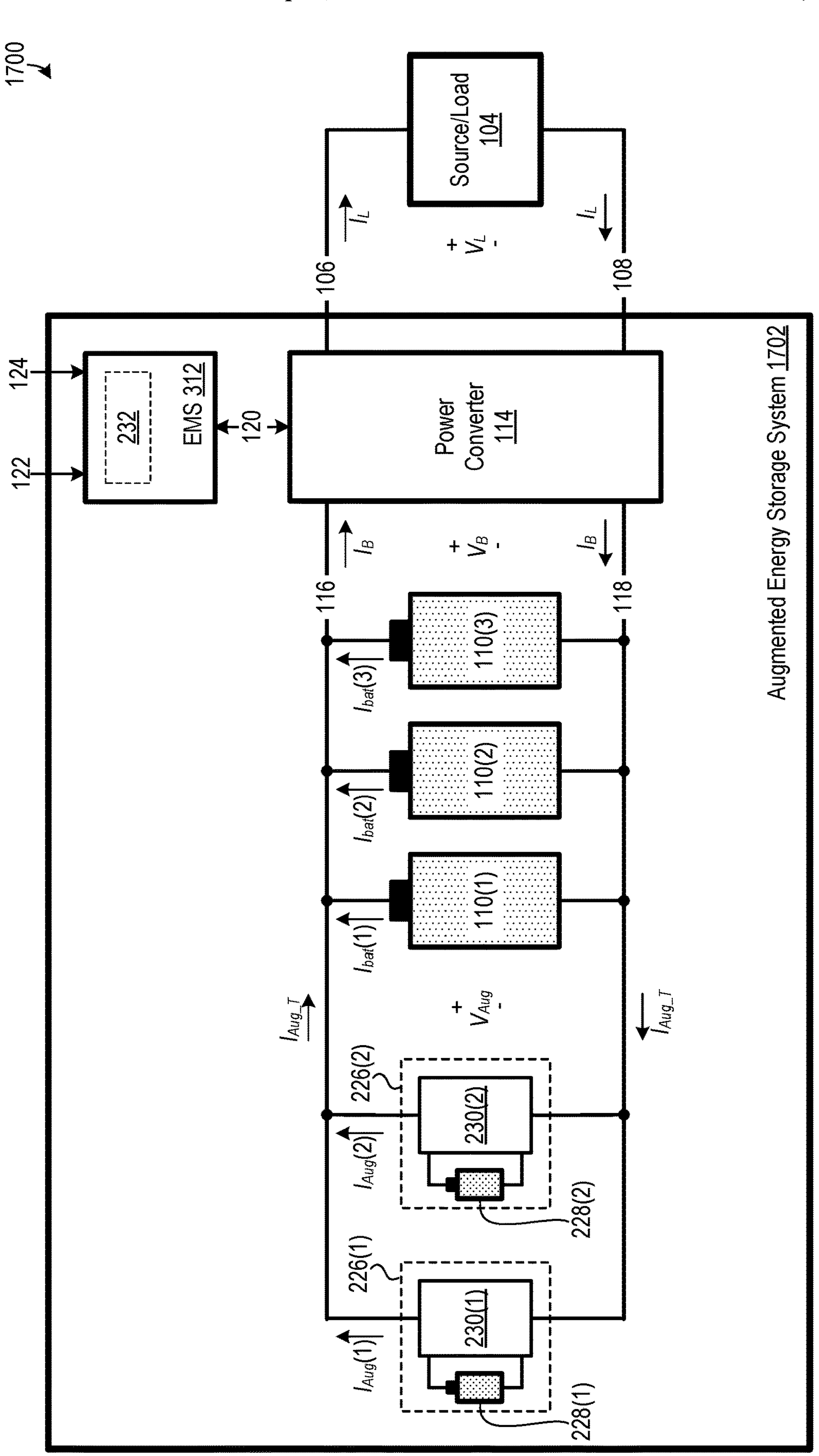
FIG. 17 is a block diagram of an alternate embodiment of the FIG. 2 electrical environment including two augmentation nodes electrically coupled in parallel.

FIG. 17 is a block diagram of an electrical environment 1700, which is an alternate embodiment of electrical environment 200 (FIG. 2) with augmented energy storage system 202 replaced with an augmented energy storage system 1702. Augmented energy storage system 1702 differs from augmented energy storage system 202 in that (a) augmented energy storage system 1702 includes two augmentation nodes 226 electrically coupled in parallel between first battery power bus 116 and second battery power bus 118 and (b) EMS 112 is replaced with EMS 312 of FIG. 3. First augmentation power buses 234 and second augmentation power buses 236 are not labeled in FIG. 17 for illustrative clarity. Connections between augmentation controller 232 of EMS 312 and augmentation power converters 230 are not shown in FIG. 17. In some alternate embodiments, augmentation controller 232 of EMS 312 is supplemented by, or replaced with, one or more augmentation controllers 232 in augmentation nodes 226. Additionally, augmented energy storage system 1702 could be modified to include or more additional augmentation nodes 226 electrically coupled in parallel between first battery power bus 116 and second battery power bus 118. Each augmentation node 226 instance need not have the same configuration. For example, capacities and/or types of augmentation batteries 228 may vary among augmentation node 226 instances.

Augmentation nodes 226 operate with a common voltage $V_{Aug}$ between first battery power bus 116 and second battery power bus 118 due to the parallel connection of the augmentation nodes. However, a respective current $I_{Aug}$ flows between (a) each augmentation power converter 230 and (b) first battery power bus 116 and second battery power bus 118. Currents $I_{Aug}$ sum to a total augmentation current $I_{Aug\_T}$, as illustrated in FIG. 17. Augmentation power converters 230 electrically buffer the respective augmentation battery 228 of each augmentation node 226 from the respective augmentation battery 228 of each other augmentation node 226.

In particular embodiments, augmentation controller 232 is configured to control augmentation power converters 230 to achieve a desired collective operation of augmentation nodes 226 for augmenting batteries 110. For example, in certain embodiments, augmentation controller 232 controls augmentation power converters 230 in augmented energy storage system 1702 to regulate magnitude of $I_{Aug\_T}$ at least partially based on state of health of batteries 110, such as using a modified version of EQN. 1 above where $I_{Aug}$ is replaced with $I_{Aug\_T}$. As another example, in certain other embodiments, augmentation controller 232 controls augmentation power converters 230 in augmented energy storage system 1702 to regulate magnitude of power ($P_{Aug\_T}$) flowing between (a) all augmentation power converters 230 and (b) first battery power bus 116 and second battery power bus 118, at least partially based on state of health of batteries 110, such as using a modified version of EQN. 3 above where $P_{Aug}$ is replaced with $P_{Aug\_T}$. As a further example, in some other embodiments, augmentation controller 232 controls augmentation power converters 230 in augmented energy storage system 1702 to regulate an impedance $R_{int\_T}$ of all augmentation nodes 226 as a function of respective impedances of batteries 110, at least partially based on state of health of batteries 110. $R_{int\_T}$ is collective impedance of all augmentation nodes 226 from the perspective of batteries 110, and $R_{int\_T}$ is equal to $V_{Aug}$ divided by $I_{Aug\_T}$. For instance, in some embodiments, augmentation controller 232 controls augmentation power converters 230 to regulate impedance $R_{int\_T}$ using a modified version of EQN. 5 above where $R_{int}$(SOC) is replaced with $R_{int\_T}$(SOC). Furthermore, certain embodiments of augmentation controller 232 are configured in augmented energy storage system 1702 to control augmentation power converters 230 such that state of charge of all augmentation batteries 228 tracks state of charge of batteries 110, such as using one of methods 900, 1100, or 1200 discussed above.

In some embodiments of electrical environment 1700, augmentation controller 232 is configured to control augmentation nodes 226 such that augmentation nodes 226 at least substantially equally augment batteries 110, i.e., such that magnitude of current $I_{Aug}$ is at least substantially the same for each augmentation node 226. However, in some other embodiments, augmentation controller 232 is configured to control augmentation nodes 226 such that magnitude of current $I_{Aug}$ may vary among augmentation node 226 instances, such as to compensate for one augmentation battery 228 having a larger capacity than another augmentation battery 228. For example, in particular embodiments, augmentation battery 228(1) has a larger capacity than augmentation battery 228(2), and magnitude of current $I_{Aug}$(1) is therefore larger than magnitude of current $I_{Aug}$(2).

Figure 18:
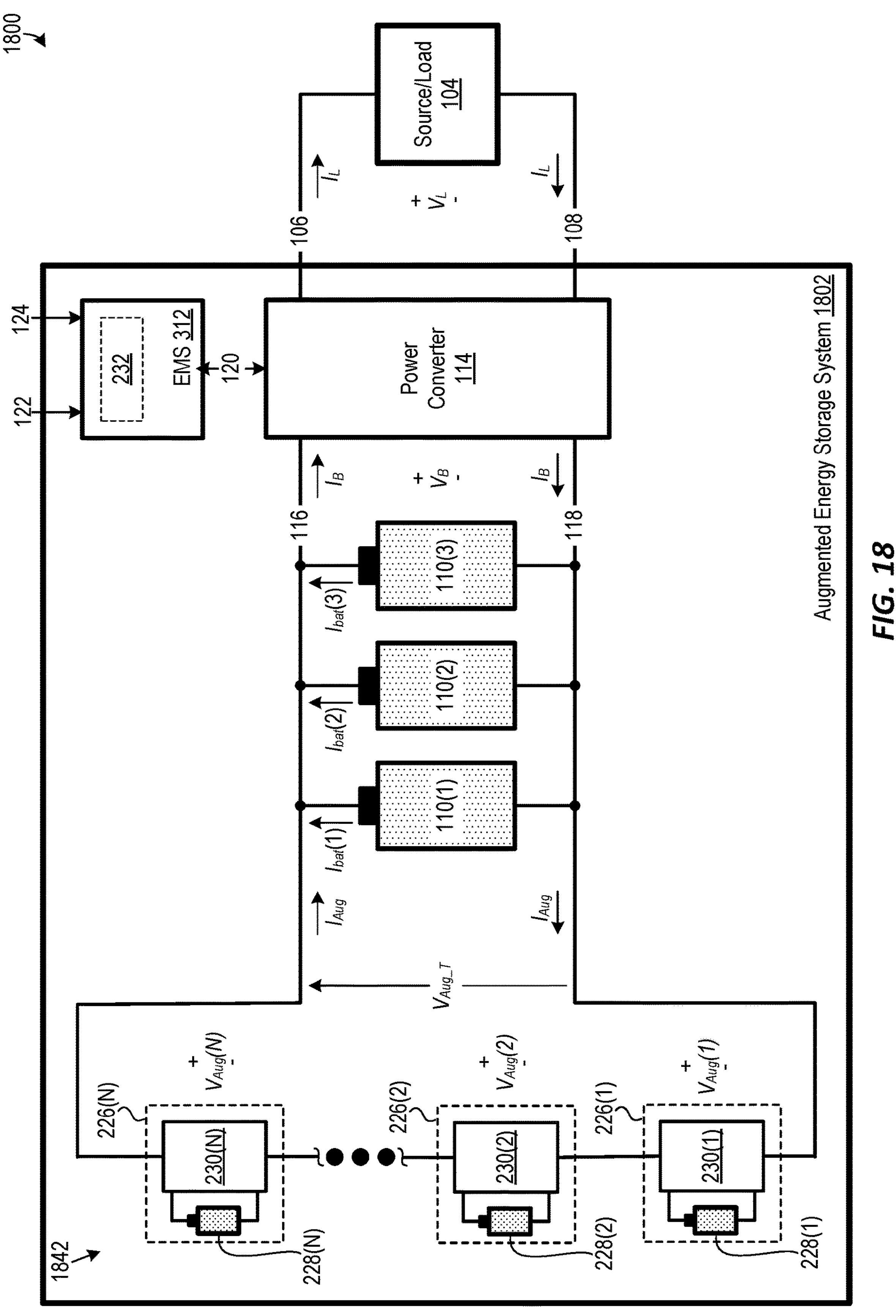
FIG. 18 is a block diagram of an alternate embodiment of the FIG. 2 electrical environment including a string of augmentation nodes electrically coupled in series.

FIG. 18 is a block diagram of an electrical environment 1800, which is an alternate embodiment of electrical environment 200 (FIG. 2) with augmented energy storage system 202 replaced with an augmented energy storage system 1802. Augmented energy storage system 1802 differs from augmented energy storage system 202 in that (a) augmented energy storage system 1802 includes a string 1842 of N augmentation nodes 226 electrically coupled in series between first battery power bus 116 and second battery power bus 118, where N is an integer greater than one, and (b) EMS 112 is replaced with EMS 312 of FIG. 3. First augmentation power buses 234 and second augmentation power buses 236 are not labeled in FIG. 18 for illustrative clarity. While FIG. 18 illustrates N being greater than two, it is understood that N could be as small two. Additionally, it should be noted that N could be a large number, such as in embodiments where magnitude of voltage $V_B$ is large. Connections between augmentation controller 232 of EMS 312 and augmentation power converters 230 are not shown in FIG. 18. In some alternate embodiments, augmentation controller 232 of EMS 312 is supplemented by, or replaced with, one or more augmentation controllers 232 in augmentation nodes 226. Additionally, augmented energy storage system 1802 could be modified to include or more additional strings of a plurality of augmentation nodes 226 electrically coupled in series between first battery power bus 116 and second battery power bus 118.

Augmentation nodes 226 operate with a common current $I_{Aug}$ due to the series connection of the augmentation nodes. However, each augmentation node 226 has a respective voltage $V_{Aug}$, and voltages $V_{Aug}$ sum to a voltage $V_{Aug\_T}$ across first battery power bus 116 and second battery power bus 118. As discussed above, each augmentation power converter 230 is, for example, a boost converter, a buck converter, a buck-boost converter, a buck and boost converter, or an isolated switching power converter. Accordingly, augmentation power converters 230 electrically buffer the respective augmentation battery 228 of each augmentation node 226 from the respective augmentation battery 228 of each other augmentation node 226. Additionally, each augmentation power converter 230 electrically buffers the augmentation battery 228 of its respective augmentation node 226 from batteries 110. Each augmentation node 226 in string 1842 need not have the same configuration. For example, capacities and/or types of augmentation batteries 228 may vary among augmentation nodes 226 in string 1842.

In particular embodiments, augmentation controller 232 is configured to control augmentation power converters 230 to achieve a desired collective operation of augmentation nodes 226 for augmenting batteries 110. For example, in certain embodiments, augmentation controller 232 controls augmentation power converters 230 in augmented energy storage system 1802 to regulate magnitude of $I_{Aug}$ at least partially based on state of health of batteries 110, such as using a modified version of EQN. 1 above. As another example, in certain other embodiments, augmentation controller 232 controls augmentation power converters in augmented energy storage system 1802 to regulate magnitude of power ($P_{Aug\_T}$) flowing between (a) all augmentation power converters 230 and (b) first battery power bus 116 and second battery power bus 118, at least partially based on state of health of batteries 110, such as using a modified version of EQN. 3 above where $P_{Aug}$ is replaced with $P_{Aug\_T}$. As a further example, in some other embodiments, augmentation controller 232 controls augmentation power converters 230 in augmented energy storage system 1802 to regulate an impedance $R_{int\_T}$ of all augmentation nodes 226 as a function of respective impedances of batteries 110, at least partially based on state of health of batteries 110. $R_{int\_T}$ is collective impedance of all augmentation nodes 226 from the perspective of batteries 110, and $R_{int\_T}$ is equal to $V_{Aug\_T}$ divided by $I_{Aug}$. For instance, in some embodiments, augmentation controller 232 controls augmentation power converters 230 to regulate impedance $R_{int\_T}$ using a modified version of EQN. 5 above where $R_{int}$(SOC) is replaced with $R_{int\_T}$ (SOC). Furthermore, certain embodiments of augmentation controller 232 are configured in augmented energy storage system 1802 to control augmentation power converters 230 such that state of charge of all augmentation batteries 228 tracks state of charge of batteries 110, such as using one of methods 900, 1100, or 1200 discussed above.

In some embodiments of electrical environment 1800, augmentation controller 232 is configured to control augmentation nodes 226 of string 1842 such that augmentation nodes 226 at least substantially equally augment batteries 110, i.e., such that magnitude of voltage $V_{Aug}$ is at least substantially the same for each augmentation node 226 of string 1842. However, in some other embodiments, augmentation controller 232 is configured to control augmentation nodes 226 such that magnitude of voltage $V_{Aug}$ may vary among augmentation nodes 226 of string 1842, such as to compensate for one augmentation battery 228 having a larger capacity than another augmentation battery 228. For example, in particular embodiments, augmentation battery 228(1) has a larger capacity than augmentation battery 228(2), and magnitude of voltage $V_{Aug}$(1) is therefore larger than magnitude of voltage $V_{Aug}$(2).

FIG. 19 is a block diagram of a method 1900 for augmenting one or more batteries in an energy storage system. In a block 1902 of method 1900, energy is exchanged between one or more first batteries of the energy storage system and a source/load via a plurality of battery power buses, where each of the first batteries is electrically coupled to the plurality of battery power buses without use of a power converter electrically coupled between the first battery and the plurality of battery power buses. In one example of block 1902, batteries 110 exchange energy with source/load 104 via first battery power bus 116 and second battery power bus 118, without use of a power converter between (a) any battery 110 and (b) first battery power bus 116 and second battery power bus 118. In a block 1904 of method 1900, the one or more first batteries are augmented via one or more augmentation batteries of an augmentation node, where the one or more augmentation batteries are electrically coupled to the plurality of battery power buses via at least one augmentation power converter. In one example of block 1904, augmentation battery 228 augments batteries 110 via augmentation power converter 230 electrically coupled to each of first battery power bus 116 and second battery power bus 118. In a block 1906 of method 1900, operation of the at least one augmentation power converter is controlled at least partially based on state of health of the one or more first batteries. In one example of block 1906, augmentation controller 232 controls operation of augmentation power converter 230 to (a) cause augmentation node 226 to provide a constant current $I_{Aug}$ based on state of health of batteries 110, (b) cause augmentation node 226 to provide a constant power $P_{Aug}$ based on state of health of batteries 110, or (c) cause augmentation node 226 to exhibit an impedance $R_{int}$, based on impedance and state of health of the batteries 110.

FIG. 20 is a block diagram of a method 2000 for augmenting one or more batteries in an energy storage system. In a block 2002 of method 2000, energy is exchanged between one or more first batteries of the energy storage system and a source/load via a power converter of the energy storage system, where the one or more first batteries are directly electrically coupled to the power converter of the energy storage system. As one example of block 2002, batteries 110, which are directly electrically coupled to power converter 114 via first battery power bus 116 and second battery power bus 118, exchange energy with source/load 104 via power converter 114. In a block 2004 of method 2000, the one or more first batteries are augmented via one or more augmentation batteries of an augmentation node that are indirectly electrically coupled to the power converter of the energy storage system via one or more augmentation power converters of the augmentation node. In one example of block 2004, augmentation battery 228, which is indirectly electrically coupled to power converter 114 via augmentation power converter 230, augments batteries 110. In a block 2006 of method 2000, operation of the one or more augmentation power converters is controlled to regulate at least one of (a) magnitude of current flowing between the augmentation node and the source/load, (b) magnitude of power flowing between the augmentation node and the source/load, and (c) impedance of the augmentation node from a perspective of the one or more first batteries, at least partially based on state of health of the one or more first batteries. In one example of block 2006, augmentation controller 232 controls operation of augmentation power converter 230 to (a) cause augmentation node 226 to provide a constant current $I_{Aug}$ based on state of health of batteries 110, (b) cause augmentation node 226 to provide a constant power $P_{Aug}$ based on state of health of batteries 110, or (c) cause augmentation node 226 to exhibit an impedance $R_{int}$, based on impedance and state of health of the batteries 110.

FIG. 21 is a block diagram of a method 2100 for augmenting one or more batteries in an energy storage system. In a block 2102 of method 2100, energy is exchanged between one or more first batteries of the energy storage system and a source/load. In one example of block 2102, batteries 110 exchange energy with source/load 104 via first battery power bus 116, second battery power bus 118, power converter 114, first load power bus 106, and second load power bus 108. In a block 2104 of method 2100, the one or more first batteries of the energy storage system are augmented via one or more augmentation batteries of an augmentation node. In one example of block 2104, batteries 110 are augmented via augmentation battery 228 of augmentation node 226. In a block 2106 of method 2100, the one or more augmentation batteries are electrically buffered from the one or more first batteries via one or more augmentation power converters electrically coupled between the one or more augmentation batteries and the one or more first batteries. In one example of block 2106, augmentation battery 228 is electrically buffered from batteries 110 via augmentation power converter 230. In a block 2108, operation of the one or more augmentation power converters is controlled to regulate at least one of (a) magnitude of current flowing between the augmentation node and the source/load, (b) magnitude of power flowing between the augmentation node and the source/load, and (c) impedance of the augmentation node from a perspective of the one or more first batteries, at least partially based on state of health of the one or more first batteries. In one example of block 2108, augmentation controller 232 controls operation of augmentation power converter 230 to (a) cause augmentation node 226 to provide a constant current $I_{Aug}$ based on SOH of batteries 110, (b) cause augmentation node 226 to provide a constant power $P_{Aug}$ based on SOH of batteries 110, or (c) cause augmentation node 226 to exhibit an impedance $R_{int}$, based on impedance and SOH of the batteries 110.

Figure 22:
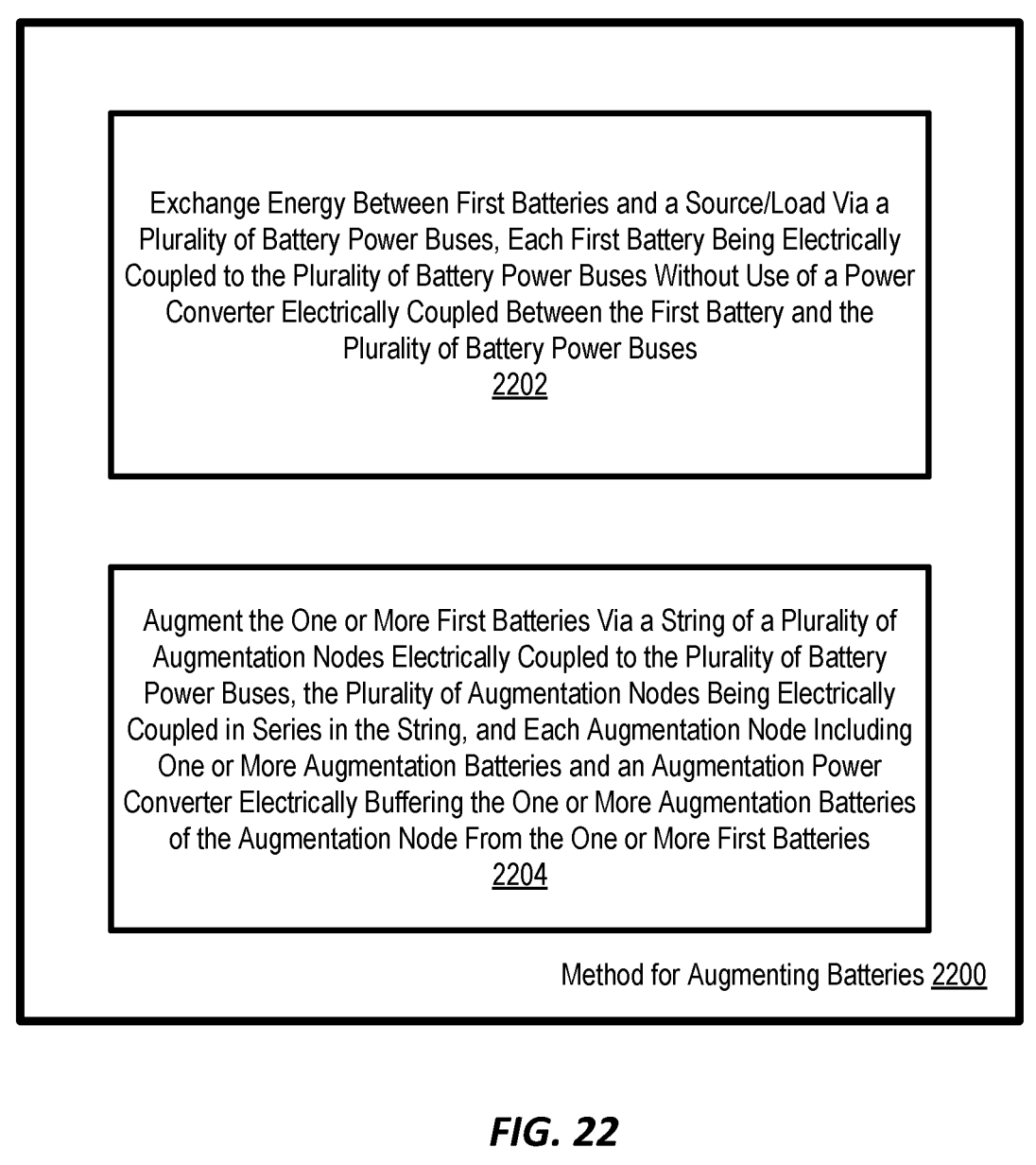

FIG. 22 is a block diagram of a method 2200 for augmenting one or more batteries in an energy storage system. In a block 2202 of method 2200, energy is exchanged between one or more first batteries of the energy storage system and a source/load via a plurality of battery power buses, where each of the first batteries is electrically coupled to the plurality of battery power buses without use of a power converter electrically coupled between the first battery and the plurality of battery power buses. In one example of block 2202, batteries 110 exchange energy with source/load 104 via first battery power bus 116 and second battery power bus 118 in electrical environment 1800, without use of a power converter between (a) any battery 110 and (b) first battery power bus 116 and second battery power bus 118. In a block 2204 of method 2200, the one or more first batteries are augmented via a string of a plurality of augmentation nodes electrically coupled to the plurality of power buses, where (a) the plurality of augmentation nodes are electrically coupled in series in the string, and (b) each augmentation node includes one or more augmentation batteries and an augmentation power converter electrically buffering the one or more augmentation batteries of the augmentation node from the one or more first batteries. In one example of block 2204, string 1842 of augmentation nodes 226 augments batteries 110 in electrical environment 1800, where each augmentation node 226 includes one or more augmentation batteries 228 and an augmentation power converter 230.

Changes may be made in the above methods, devices, and systems without departing from the scope hereof. It should thus be noted that the matter contained in the above description and shown in the accompanying drawings should be interpreted as illustrative and not in a limiting sense. The following claims are intended to cover generic and specific features described herein, as well as all statements of the scope of the present method and system, which as a matter of language, might be said to fall therebetween.

What is claimed is:

1. A method for augmenting one or more batteries in an energy storage system, the method comprising:

exchanging energy between one or more first batteries of the energy storage system and a source/load via a plurality of battery power buses, each of the one or more first batteries being electrically coupled to the plurality of battery power buses without use of a power converter electrically coupled between the first battery and the plurality of battery power buses;

augmenting the one or more first batteries via one or more augmentation batteries of an augmentation node, the one or more augmentation batteries being electrically coupled to the plurality of battery power buses via at least one augmentation power converter; and controlling operation of the at least one augmentation power converter at least partially based on state of health of the one or more first batteries.

2. The method of claim 1, wherein the source/load is capable of both providing electric power to the energy storage system and receiving electric power from the energy storage system.

3. The method of claim 1, further comprising electrically interfacing the one or more first batteries with the source/load via a power converter electrically coupled between the plurality of battery power buses and the source/load.

4. The method of claim 1, wherein controlling operation of the at least one augmentation power converter at least partially based on the state of health of the one or more first batteries comprises controlling the at least one augmentation power converter to regulate magnitude of current flowing between the at least one augmentation power converter and the plurality of battery power buses, at least partially based on the state of health of the one or more first batteries.

5. The method of claim 1, wherein the state of health of the one or more first batteries comprises a relationship between present capacity of the one or more first batteries and original capacity of the one or more first batteries.

6. The method of claim 1, wherein controlling operation of the at least one augmentation power converter at least partially based on the state of health of the one or more first batteries comprises controlling the at least one augmentation power converter to regulate magnitude of power flowing between the at least one augmentation power converter and the plurality of battery power buses, at least partially based on the state of health of the one or more first batteries.

7. The method of claim 1, wherein controlling operation of the at least one augmentation power converter at least partially based on the state of health of the one or more first batteries comprises controlling the at least one augmentation power converter to regulate impedance of the augmentation node, as seen from a perspective of the one or more first batteries, at least partially based on the state of health of the one or more first batteries.

8. The method of claim 1, further comprising controlling the at least one augmentation power converter based at least partially on state of charge of the one or more first batteries.

9. The method of claim 1, further comprising controlling the at least one augmentation power converter to decrease a difference between (a) state of charge of the one or more first batteries and (b) state of charge of the one or more augmentation batteries.

10. The method of claim 9, wherein the state of charge of the one or more first batteries comprises one of an average state of charge of the one or more first batteries and a median state of charge of the one or more first batteries.

11. The method of claim 9, wherein the state of charge of the one or more augmentation batteries comprises one of an average state of charge of the one or more augmentation batteries and a median state of charge of the one or more augmentation batteries.

12. The method of claim 1, further comprising iteratively controlling the at least one augmentation power converter to decrease a difference between (a) state of charge of the one or more first batteries and (b) state of charge of the one or more augmentation batteries.

13. An augmented energy storage system, comprising:

a first battery power bus;

a second battery power bus;

one or more first batteries, each first battery being electrically coupled between the first battery power bus and the second battery power bus without use of a power converter;

a plurality of augmentation nodes electrically coupled between the first battery power bus and the second battery power bus, each augmentation node including a respective augmentation battery and respective augmentation power converter; and a controller configured to control operation of the respective augmentation power converter of each augmentation node at least partially based on state of health of the one or more first batteries.

14. The augmented energy storage system of claim 13, wherein the plurality of augmentation nodes are electrically coupled in series between the first battery power bus and the second battery power bus.

15. The augmented energy storage system of claim 13, wherein the plurality of augmentation nodes are electrically coupled in parallel between the first battery power bus and the second battery power bus.

16. The augmented energy storage system of claim 13, wherein in each augmentation node, the augmentation power converter of the augmentation node is configured to buffer the augmentation battery of the augmentation node from the respective augmentation battery of each other augmentation node.

17. The augmented energy storage system of claim 13, wherein the controller is further configured to control the respective augmentation power converter of each augmentation node at least partially based on the state of health of the one or more first batteries to regulate magnitude of current flowing through the plurality of augmentation nodes.

18. The augmented energy storage system of claim 13, wherein the controller is further configured to control the respective augmentation power converter of each augmentation node at least partially based on the state of health of the one or more first batteries to regulate magnitude of power flowing between the plurality of augmentation nodes and the first and second battery power buses.

19. The augmented energy storage system of claim 13, wherein the controller is further configured to control the respective augmentation power converter of each augmentation node at least partially based on the state of health of the one or more first batteries to regulate collective impedance of the plurality of augmentation nodes, as seen from a perspective of the one or more first batteries.

20. A method for augmenting one or more batteries in an energy storage system, the method comprising:

exchanging energy between one or more first batteries of the energy storage system and a source/load;

augmenting the one or more first batteries of the energy storage system via one or more augmentation batteries of an augmentation node;

electrically buffering the one or more augmentation batteries from the one or more first batteries via one or more augmentation power converters electrically coupled between the one or more augmentation batteries and the one or more first batteries; and controlling operation of the one or more augmentation power converters to regulate at least one of (a) magnitude of current flowing between the augmentation node and the source/load, (b) magnitude of power flowing between the augmentation node and the source/load, and (c) impedance of the augmentation node from a perspective of the one or more first batteries, at least partially based on state of health of the one or more first batteries.

* * * * *